(12) United States Patent
Iversen et al.

(10) Patent No.: US 11,682,369 B2
(45) Date of Patent: Jun. 20, 2023

(54) LIGHT EMITTING DISPLAY WITH TILES AND DATA PROCESSING

(71) Applicant: IMAX Theatres International Limited, Dublin (IE)

(72) Inventors: Steen Svendstorp Iversen, Dublin (IE); Steven Charles Read, Mississauga (CA); Anton Leonard Baljet, Oakville (CA)

(73) Assignee: IMAX Theatres International Limited, Dublin (IE)

( * ) Notice: Subject to any disclaimer, the term of this patent is extended or adjusted under 35 U.S.C. 154(b) by 0 days.

(21) Appl. No.: 16/640,462

(22) PCT Filed: Sep. 20, 2018

(86) PCT No.: PCT/IB2018/057267
§ 371 (c)(1),
(2) Date: Feb. 20, 2020

(87) PCT Pub. No.: WO2019/058307
PCT Pub. Date: Mar. 28, 2019

(65) Prior Publication Data
US 2020/0193943 A1    Jun. 18, 2020

Related U.S. Application Data

(60) Provisional application No. 62/560,922, filed on Sep. 20, 2017.

(51) Int. Cl.
*G09G 5/42* (2006.01)
*G06F 3/14* (2006.01)
*G09G 3/32* (2016.01)

(52) U.S. Cl.
CPC ............. *G09G 5/42* (2013.01); *G06F 3/1446* (2013.01); *G09G 3/32* (2013.01);
(Continued)

(58) Field of Classification Search
CPC ...... G09G 5/42; G09G 3/32; G09G 2300/026; G09G 2310/0232; G09G 2320/0233;
(Continued)

(56) References Cited

U.S. PATENT DOCUMENTS

| 1,945,710 A | 2/1934 | Smoot |
| 2,448,560 A | 9/1948 | Walker |

(Continued)

FOREIGN PATENT DOCUMENTS

| CN | 1512820 | 7/2004 |
| CN | 101069454 | 11/2007 |

(Continued)

OTHER PUBLICATIONS

International Patent Application No. PCT/IB2018/057267, "International Search Report and Written Opinion", dated Jan. 29, 2019, 31 pages.

(Continued)

*Primary Examiner* — Temesghen Ghebretinsae
*Assistant Examiner* — Ivelisse Martinez Quiles
(74) *Attorney, Agent, or Firm* — Kilpatrick Townsend & Stockton LLP

(57) ABSTRACT

A light emitting display can be formed from tiles mounted within a certain distance range with respect to each other and with an established blending region positioned towards the edges of the tiles. A tile can be a matrix of light emitting elements, such as LEDs, OLEDs, quantum dots, or other element that emits light. The tolerance of spacing between tiles can allow for less precision in alignment during installation in a theatre, thereby reducing display assembly cost but still maintaining a display for displaying an image at a high quality with reduced or eliminated appearance of visual artifacts between tiles.

23 Claims, 12 Drawing Sheets

(52) U.S. Cl.
CPC ............... *G09G 2300/026* (2013.01); *G09G 2310/0232* (2013.01); *G09G 2320/0233* (2013.01); *G09G 2320/0693* (2013.01)

(58) Field of Classification Search
CPC ....... G09G 2320/0693; G09G 2356/00; G09G 2360/122; G06F 3/1446; G09F 9/3026; G09F 9/33; H01L 25/0753
See application file for complete search history.

(56) References Cited

U.S. PATENT DOCUMENTS

| | | |
|---|---|---|
| 2,974,566 A | 3/1961 | Hurley |
| 5,366,761 A | 11/1994 | Chin et al. |
| 6,513,622 B1 | 2/2003 | Gelow et al. |
| 6,999,665 B2 | 2/2006 | Veligdan |
| 7,862,206 B2 | 1/2011 | Chen et al. |
| 8,049,747 B2 | 11/2011 | Arneson et al. |
| 8,300,304 B2 | 10/2012 | Gally et al. |
| 8,542,270 B2 | 9/2013 | Nelson |
| 8,944,609 B2 | 2/2015 | Fox et al. |
| 9,030,386 B2 | 5/2015 | Park |
| 9,069,121 B2 | 6/2015 | Ligorano et al. |
| 9,558,720 B2 | 1/2017 | Jepsen et al. |
| 10,638,218 B2 | 4/2020 | Slack |
| 10,807,016 B2 | 10/2020 | Tremblay et al. |
| 2005/0078104 A1* | 4/2005 | Matthies ............... H01L 25/167 345/204 |
| 2006/0153391 A1 | 7/2006 | Hooley et al. |
| 2006/0170614 A1 | 8/2006 | Tzong et al. |
| 2006/0262273 A1 | 11/2006 | Read et al. |
| 2007/0035706 A1 | 2/2007 | Margulis |
| 2008/0118178 A1 | 5/2008 | Way et al. |
| 2010/0053450 A1* | 3/2010 | Hanamura ............ G06F 3/1446 348/687 |
| 2010/0073468 A1 | 3/2010 | Kutner |
| 2013/0093646 A1* | 4/2013 | Curtis ............... G02F 1/133606 345/1.3 |
| 2013/0335716 A1 | 12/2013 | Shields |
| 2014/0071026 A1 | 3/2014 | Hatashita et al. |
| 2014/0168786 A1 | 6/2014 | Lee |
| 2014/0177062 A1 | 6/2014 | Lee et al. |
| 2014/0233747 A1 | 8/2014 | Fox |
| 2014/0235362 A1 | 8/2014 | Fox et al. |
| 2015/0208151 A1 | 7/2015 | Fox |
| 2016/0086582 A1* | 3/2016 | Hu ........................ G06F 3/1446 345/1.3 |
| 2016/0163018 A1 | 6/2016 | Wang et al. |
| 2016/0366379 A1 | 12/2016 | Hickl |
| 2017/0116895 A1 | 4/2017 | Declerck |
| 2018/0006011 A1* | 1/2018 | Ninan ................... H01L 27/156 |
| 2018/0190747 A1* | 7/2018 | Son ........................ G09G 3/32 |
| 2019/0043940 A1* | 2/2019 | Lee ....................... H01L 27/156 |
| 2020/0068295 A1 | 2/2020 | Congard |
| 2020/0160829 A1 | 5/2020 | Iversen et al. |
| 2020/0193943 A1 | 6/2020 | Iversen et al. |
| 2021/0001242 A1 | 1/2021 | Tremblay et al. |
| 2021/0134212 A1* | 5/2021 | Kim ..................... G06F 3/1446 |

FOREIGN PATENT DOCUMENTS

| | | |
|---|---|---|
| CN | 101273660 | 9/2008 |
| CN | 201836731 U | 5/2011 |
| CN | 202548524 | 11/2012 |
| CN | 104067150 | 9/2014 |
| CN | 204406978 U | 6/2015 |
| CN | 204925601 U | 12/2015 |
| CN | 105243978 | 1/2016 |
| CN | 105247150 | 1/2016 |
| CN | 205278981 U | 6/2016 |
| EP | 1435755 | 7/2004 |
| EP | 1883920 | 2/2008 |
| EP | 3111639 | 1/2017 |
| EP | 3155606 | 4/2017 |
| JP | 06214508 | 8/1994 |
| JP | 06327090 | 11/1994 |
| JP | 2001133888 | 5/2001 |
| JP | 2003177465 | 6/2003 |
| JP | 2005117267 | 4/2005 |
| JP | 2005269402 | 9/2005 |
| JP | 2008542994 | 11/2008 |
| JP | 2009528086 | 8/2009 |
| JP | 2012204979 | 10/2012 |
| JP | 2012529073 A | 11/2012 |
| KR | 910009794 | 11/1991 |
| KR | 20070086826 | 8/2007 |
| KR | 20110032180 | 3/2011 |
| WO | 2007087376 | 8/2007 |
| WO | 2008093721 | 8/2008 |
| WO | 2011135283 | 11/2011 |
| WO | 2016115040 | 7/2016 |
| WO | 2018065955 | 4/2018 |

OTHER PUBLICATIONS

International Patent Application No. PCT/IB2018/057267, "Invitation to Pay Add'l Fees and Partial Search Report", dated Dec. 6, 2018, 27 pages.
EP Application No. EP18785440.1, Office Action, dated Feb. 16, 2022, 24 Pages.

* cited by examiner

LIGHT EMITTING DISPLAY WITH TILES AND DATA PROCESSING

CROSS-REFERENCE TO RELATED APPLICATION

This claims priority to U.S. Provisional Application Ser. No. 62/560,922, titled "Light Emitting Display with Tiles and Data Processing" and filed Sep. 20, 2017, the entire contents of which is incorporated herein by reference.

TECHNICAL FIELD

This disclosure relates generally to active displays that include tiles forming the displays. More particularly, but not necessarily exclusively, this disclosure relates to light emitting displays formed by tiles for a theatre environment.

BACKGROUND

Light emitting displays, such as LED displays, can be used as advertising billboards. LED displays are becoming of interest to cinema applications in part because of benefits in image quality parameters such as brightness and contrast. Large LED displays are often constructed in modular form from tiles. Each tile includes LEDs and form pixels or sub-pixels of the display. The tiles are mounted side by side, typically on-site at installation time on a supporting frame. In cinema applications where audiences may be viewing the LED display from a relatively short distance, premium image quality is expected. Tiles that are misaligned, however, can result in seams between adjacent tiles that are visible. Installing tiles to avoid misalignments can be inefficient, costly, difficult, and time consuming. Maintaining the tiles to avoid misalignments can also be challenging.

DETAILED DESCRIPTION

Figure 1:
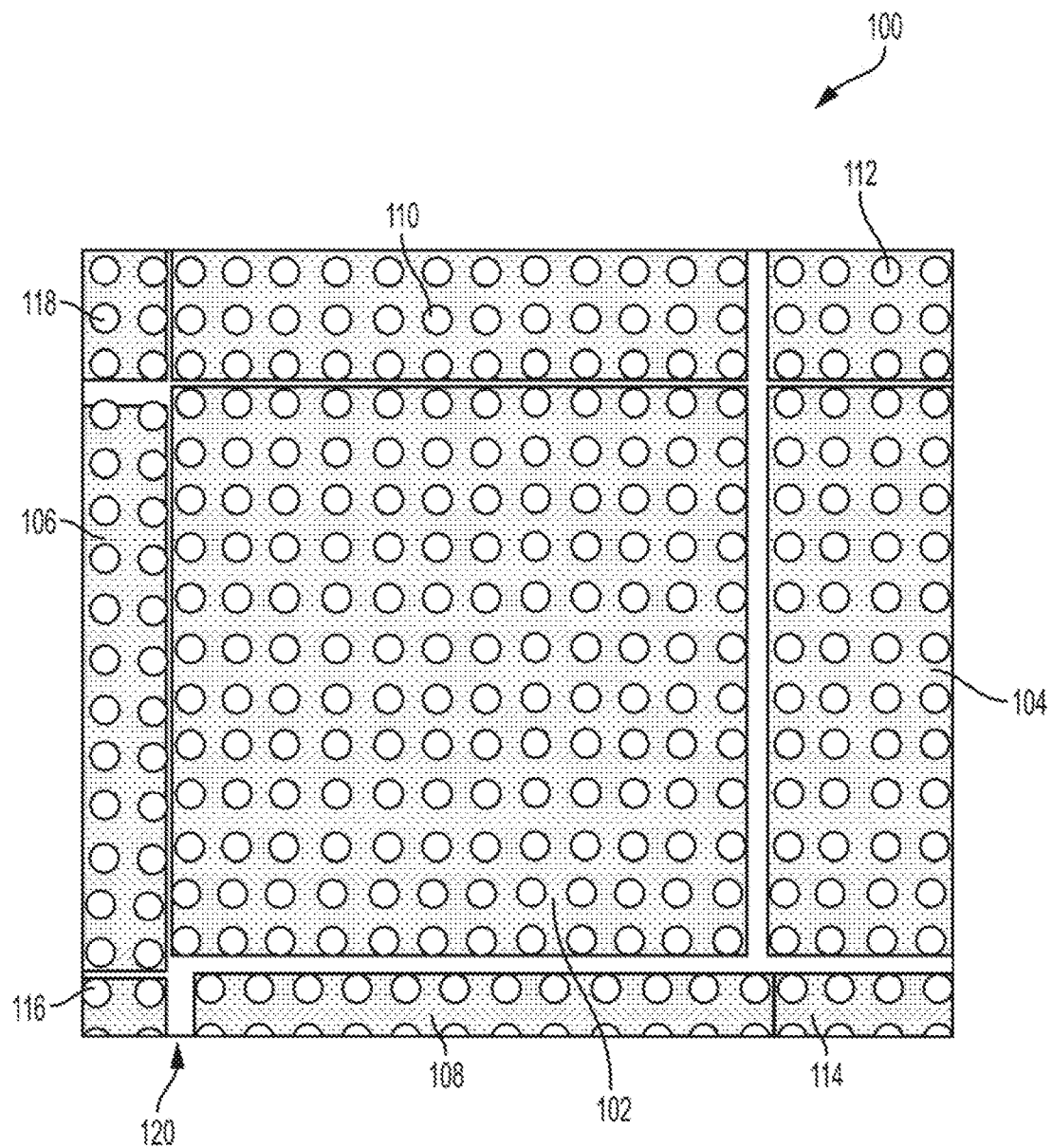
FIG. 1 is a front view of part of an LED display that includes tiles, some of which are misaligned, according to one example of the present disclosure.

Certain aspects and features relate to a light emitting display with tiles mounted within a certain distance range with respect to each other and with an established blending region positioned towards the edges of the tiles. A tile can be a matrix of light emitting elements, such as LEDs, OLEDs, quantum dots, or other element that emits light. The tolerance of spacing between tiles can allow for less precision in alignment during installation in a theatre, thereby reducing display assembly cost but still maintaining a display for displaying an image at a high quality with reduced or eliminated appearance of visual artifacts between tiles.

Currently, display tiles are assembled such that a relatively precise uniform pitch exists between tiles. The pitch is a distance between centers of two neighboring light emitting elements of a tile in the display. The pitch is maintained between adjacent tiles to within narrow tolerances of a minimum pitch and a maximum pitch. In some examples of the present disclosure, the range of distance for a pitch is not limited to a minimum pitch and can be limited to within a maximum pitch. Images for display by the light emitting display can be digitally compensated to further reduce or eliminate misalignment artifacts in areas where the actual pitch is less than the average pitch between light emitting elements or is otherwise smaller than normal. This can allow for a more relaxed mounting tolerance between tiles such that mounting the tiles can be completed in a less costly and a more time efficient manner. In some examples, a calibration process can be implemented that captures the location of each tile with respect to adjacent tiles to determine angular or translational shifts between adjacent tiles and to generate a calibration file. The calibration file can be used to modify image data that is provided to the LED display for output by the light emitters on the tiles. For example, the image data can be warped based on positional information of the tiles with respect to each other so that the content that is delivered to at least some tiles (or to some light emitters of some tiles) is modified. The modified image data can account for misalignments between tiles such that the displayed image data does not appear misaligned from an audience perspective, thus making the physical tile misalignment less perceptible or not perceptible at all, and maintaining a visual experience of high quality.

A calibration process according to some examples can include using an image sensor, such as a camera, to capture a displayed calibration image to determine angular rotation or translational shift of each tile relative to the adjacent tiles in the display. The calibration image may be an alignment image with a known pattern. In some examples, the alignment image has a well-defined centroid or multiple defined centroids. The calibration file can be used to modify image data that is intended for displaying on display systems that have an orderly x-y matrix of light emitters and do not have tiles that have varying gaps between tiles. The calibration file can be used to compensate for displaying image data on a display of tiles that can have translational and angular offsets between adjacent tiles. The calibration file can have accurate positional and angular coordinate information for each tile and each of the light emitters on the tile. (The terms "light emitter," "display pixel," and "pixel" are used interchangeably throughout the description to refer to a light emitting element on a tile.) The image data that has been modified based on the calibration information can be used to perform re-sampling of the image data. For example, the image data can be warped based on light emitter positioning information to modify the content of the image that is provided to a least some light emitters for display. An example of one process to warp the image is to perform interpolation using the position of the light emitters and a reference image. Brightness of an area of a tile may be accounted for during the resampling. For example, a brightness calibration can be performed of the light emitters prior to image re-sampling to compensate for brightness irregularities across a tile and between adjacent tiles. Doing so can further reduce or eliminate the perceptibility of seams between tiles in an LED display.

In additional or alternative examples, the spatial density of light emitting elements at edges or near an edge of adjacent tiles can be increased to reduce the perceptibility of misalignments between tiles, brightness non-uniformities, and varying distances between light emitting element. For example, the spatial densities of pixels or sub-pixels at, or near, the edges of the tiles can be higher than the average spatial pixel or sub-pixel density in other areas of the tile. The region along the edge where the spatial density of the light emitters is greater than other areas of the tile can be a blending region. The larger the area of a blending region, the more differences in tile alignment can be made to look more gradual over the blending region.

Visual acuity is a viewer's ability to resolve the smallest visual detail. There is a limit as to how small visual detail a viewer can resolve, which can be specified as a threshold distance (Dmin). Image detail, such as the space or pitch between light emitters, that is dimensionally less than the threshold distance can result in a viewer being unable to determine if the light emitter source is as wide as the pitch or if the light emitter is a point source within the pitch. Likewise, if a gap between tiles is less than the threshold distance, the viewer may be unable to resolve the width of a gap. The threshold distance can be based on the distance that a viewer with 20/20 vision seated in the front row of a theatre is from the area of the display. For example, a person with 20/20 vision may be able to resolve characters separated by 1/60 of a degree. Multiplying the tangent of 1/60 of a degree by the distance between the display detail and the viewer positioned in the front row in a theatre can result in a maximum allowable distance between tiles in the display for a particular cinema installation. As one example, a viewer positioned seven meters from a display can have visual acuity of display details no smaller than two millimeters (determined by (tan (1/60)×7000 mm).

The tiles can be mounted via any type of mounting mechanism. Examples of a mounting mechanism include externally threaded studs, internally threaded spacers, and threaded jack posts soldered to the back of the printed circuit board that line up with a number of corresponding holes in a mounting frame. A hole in the frame can allow a threaded post or jack post to pass through the hole to fasten a nut. Alternatively, a screw can be passed through a hole in the frame to fasten onto an internally threaded spacer on the printed circuit board (PCB). Tiles that are installed side by side in a regular pattern in a display can be mounted as described above within a prescribed tolerance. For example, a tile mounting tolerance may be +/− 0.1 mm to 0.35 mm. Mounting the tiles can include using target mounting positions such that the distance between centers of the light emitting elements (i.e. pitch) can be maintained across the space between the tiles so that the light emitter pitch remains consistent when transitioning from one tile to the next. A tile mounting tolerance can affect the spacing between tiles such that the pitch between the tiles may vary and make pitch appear inconsistent when transitioning from one tile to an adjacent tile. By taking advantage of the distance threshold for a display in a cinema theatre configuration, perceptibility of the variation of the space between tiles can be minimized.

In one example, the threshold distance for the viewer in a front row looking at the display is 2 mm, the pitch between light emitting elements is 2 mm, and a mounting tolerance of the tile mounting frame is 0.25 mm, such that the target mounting position between the two adjacent tiles can be 2 mm with a tolerance of +/− 0.25 mm (i.e., a pitch range of 1.75 mm to 2.25 mm). Positioning the center of the light emitting element on the PCB of each tile at half of the pitch distance from the edge of the board can result in no room to accommodate for full range of mounting variations in the tile mounting frame and can become problematic. One approach to overcome this issue can include positioning the light emitting element closer to the edge of the tile. By doing so, the distance from the center of the light emitting element to the board edge can be reduced, providing additional available gap space to accommodate for the tile mounting tolerance of the frame. For example, if the distance from the center of the light emitting element to the edge of the board is reduced from half the pitch to 3/8 of the pitch, an additional space of 1/4 of the pitch, or in the case of the example a 0.5 mm space, can be provided. With a 1.75 mm target pitch position and the +/− 0.25 mm tolerance, the tiles can be mounted within the tolerance of the tile mounting frame.

With a threshold distance of 2 mm, which can be used to loosen the frame tile mounting tolerance and to take advantage of the increased free gap space that occurs by mounting the edge of the light emitting devices as close as possible to the tile edge, a 1 mm range of free gap space can be available between the adjacent tile edges. For example, the edge of the emitter can be at the edge of the tile and the edge of the tile to the center of the emitter can be 1/4 the pitch (i.e., 0.5 mm). In this example, a pitch variation occurring between adjacent tile light emitting elements can range from 1 mm to 2 mm. The range is within the 2 mm threshold distance and may not be spatially perceived by a viewer positioned 7 meters from the display. Variations of 0 mm to 1 mm in gap space between adjacent tiles may not be visually perceptible such that a mounting tolerance of a target mounting position can be +/− 0.5 mm instead of +/− 0.25 mm as would otherwise be used. An optically allowable mount range can be 1 mm instead of restricting the mounting range to 0.5. A pitch variation occurring between adjacent tile light emitting elements can then range from 1 mm to 2 mm. This range is within the 2 mm threshold distance and may not be spatially perceived by a viewer positioned 7 meters from the display. But, two adjacent light emitting elements with a reduced pitch spacing may have the brightness reduced in an amount proportional to the amount that the pitch has been reduced to maintain brightness uniformity of the transition between tiles to be consistent with the uniformity of brightness over other areas of the two tiles. A reduction of tolerance for alignment that has been reduced from a 0.5 mm range to a 1 mm range (i.e., a 100% reduction in a tolerance) can allow tile-mounting frames to be designed and built with less precision and cost. If an alignment tolerance of 0.1 mm may have been previously required, an alignment range of 0.2 mm can be loosened to a 1 mm range (i.e., a 500% reduction in needed precision). If adjacent tile edges are separated by a distance greater than the distance of 1 pitch, where the average pitch is greater than 2 mm, than the increase pitch distance can be spatially perceived because this increased pitch distance is now greater than the threshold distance.

The gap space can be further increased if a dimensionally smaller light emitting element is used. For example, a 0.5 mm-wide light emitting element used on two adjacent edges can allow the edge to be a ⅛ of the pitch, providing an additional 0.5 mm of gap space. The gap range in that example can be from 0 mm to 1.5 mm (i.e., ¼ pitch to 1 pitch). For cinema presentations, ambient light can be removed from the viewing auditorium so the light levels of the display may not need to be as high as would normally be the case for a display to overcome outside ambient light. The power level of the light emitting element can then be less and the light emitting element can be smaller in a cinema application.

In another example, the pitch is increased to a 4 mm pitch between the same light emitting element centers. The threshold distance can the same at 2 mm, and the light emitting elements centers can be mounted 0.5 mm from the tile edge. There may be as much as 0 mm to 3 mm of gap space variation (i.e., a 1 mm to 4 mm pitch range) between the adjacent tile edges. In this example, the possible pitch range exceeds the threshold distance and can lead to additional limitations. There can be four different gap spacings that can lead to three different visual spatial artifacts. When the gap is 3 mm in this example, the tile edge light emitters can have a 4 mm pitch, the same as a tile's average pitch, which may result in no visual artifacts. The average pitch of a tile can be the distance between centers of adjacent light emitting elements on a tile that is the intended distance between light element centers over the other areas of the tile. A gap of 0 mm can cause the pitch at the tile edge to be 1 mm and the two emitters may appear as one emitter by a viewer, and with minimal visual spatial artifacts, because these two emitters are positioned within the threshold distance of 2 mm. A gap of 1 mm can cause the pitch to be 2 mm at the tile edge, at the threshold distance, which may appear to the viewer with a visual artifact resembling a fatter light emitter. A gap of 2 mm can cause the pitch to be 3 mm at the tile edge, exceeding the threshold distance, which may appear to the viewer with a visual artifact of two separate emitting elements with a shorter pitch than the average pitch. Two positions can be acceptable for gap spacing (i.e., 0 mm and 3 mm gap spacing between adjacent tile edges), and the 1.5 mm gap spacing can result in a least desirable visual artifact, and any other gap spacing can provide an in-between visual artifact result. A situation in which pitch dimension is considerably larger than a threshold distance can create a more challenging situation for mounting tiles in a frame for a display.

A display in which pitch dimension is the same or significantly less than the threshold distance can be constructed with a tile mounting frame that has a reduced tolerance for mounting tiles and the adjacent light emitting elements with a pitch less than the average pitch of the light emitting elements of the tile. The light emitting elements can have brightness proportionately adjusted to compensate for the reduction in their pitch. If the viewer is positioned further from the display, the threshold distance can increase to allow for a further reduction in mounting tolerance between tiles.

Brightness of adjacent light emitting elements at the edges of adjacent tiles can be adjusted using various processes. In one example, a visual recording the actual physical location of each light emitting element (such as an LED) in a tile is captured using a camera or other type of image sensor. A table of positions of light emitting elements can be created using the recorded visual information and known data about locations of light emitting elements within each tile. The positions of light emitting elements can include the physical location of each light emitting element of the display. An image for the display can be resampled based on the information in the table, and the resampled image can be transformed for the display to eliminate artifacts caused by tile mounting tolerances such as visible seams between edges of tiles. Misaligned contours in displayed image content can also be prevented from occurring.

Light emitting elements can include a semiconductor LED or an organic LED, and may refer to a single LED or a cluster of LEDs, such as an RGB LED package in which each of the RGB colors are in a single light emitting element in a light emitting display, and may even include other light sources that can replace LEDs in direct view displays.

FIG. 1 is a front view (e.g., from the audience side) of part of an LED display 100 that includes a center tile 102 surrounded by adjacent tiles 104, 106, 108, 110, 112, 114, 116, some of which can be misaligned (e.g. at misalignment 120) with respect to the center tile 102. Each of the tiles 102-116 can include a printed circuit board and light emitting elements such as LEDs (represented by dots in FIG. 1) that can be surface-mounted devices positioned onto the circuit board in a matrix pattern. The LEDs can have any dimension, but an example is 1.0 mm in width and 1.0 mm in length. Spacing between edges of the LEDs, for example, can be 1.0 mm, such that the spacing between horizontally and vertically adjacent pixel centers (i.e., the light emitting element pitch) is 2.0 mm. LEDs in the top row edge, the bottom row edge, the left edge, and the right edge of the center tile 102 may be located as close as possible to the edges of the circuit board of the center tile 102. The LEDs mounted at the edges in the tiles 104-116 that are adjacent to the center tile 102 can also be as close as possible to the edges of the respective circuit boards of the respective tiles 104-116.

The maximum separation of adjacent tile edges can be based on the distance that is the target distance threshold for visual acuity—the pitch is similar or less than the threshold distance. For example, the threshold distance can be 2 mm based on a viewer that is 7 meters from two adjacent tiles that form part of the display 100. The display 100 can be constructed of tiles 102-116 such that, in the worst case, adjacent tile edge spacing misalignment of the target tile mounting position can be the light element pitch distance at the tile edges being within the threshold distance (Dmin).

For 1 mm-by-1 mm LEDs, the tile can have an average pitch between light emitting elements of 2 mm. LEDs at the tile edge can be positioned closely flush with the tile edge to allow the space between the adjacent tiles edges to vary from 0 mm to 1 mm. The target position of the adjacent tiles 104-116 with respect to each other can be the midpoint of the average pitch. In this example, the midpoint can be a 1 mm position between the tile edge light emitting element centers. And, the position can have an allowable tolerance range of +/− 0.5 mm because the pitch variation between the adjacent tiles 104-116 is within the threshold distance. If the adjacent tile edge spacing increases to cause the pitch between adjacent LEDs on adjacent edges of a tile to be greater than 2 mm, the threshold distance of 2 mm is exceeded and may result in a viewer being able to visually perceive a spatial artifact between these two LEDs.

Adjacent tile edges can be horizontal, vertical, or diagonal in orientation. The tile edges can be one straight edge, a compilation of straight edges in various orientations, curved, or combinations thereof.

In some examples, adjacent tiles can also be aligned by having the area near the edge of adjacent tiles be a blending region that can be more than one pixel in from the tile edge and can be as many as ten pixels in from the tile edge or more, depending on the size of the tile area. An observer may be located at a distance from the display tiles such that the observer is unable to resolve the space between light emitting areas of LEDs on a tile. When an observer no longer has visual acuity of individual light emitting elements or the space between the light emitting elements on a tile, the observer can no longer differentiate whether the light emitter is a small light emitting area relative to the pitch or a large light emitting area relative to the pitch between light emitting sources. For an observer positioned at the back of the theatre, the threshold distance can be greater than for an observer positioned at the front row of the theatre.

A display of tiles can have the pitch of the light emitting devices be greater than the threshold distance for a front observer but within the threshold distance for an observer at the middle or back position in the theatre. A blending region can compensate for a pitch that is more than a threshold distance to a front row observer such that the light emitting element spatial density near adjacent tile edges is greater than the light emitting element spatial density at other areas on the tiles. The pitch of the light emitters in the more spatially dense regions can be within the threshold distance for observers in a front row to help distribute slight misalignments between adjacent tiles over an area that is the blending area. The brightness of the light emitting elements in the blending region can be adjusted to compensate for spatial differences or variations in pitch between light emitter sources that are within a threshold distance in a blending region. An observer may be unable to directly resolve any varying gaps between adjacent tile edges or sudden angular transitions or translational transitions between rows or columns of light emitting elements of adjacent tiles of light emitters. Having greater spatial density of light emitters around the edges of tiles can smooth out angular misalignment or translational shifts between adjacent tiles by spreading the alignment differences over a larger area next to the tile edges between the adjacent tiles. By increasing the area of greater spatial light emitting density next to the edge of the tile, a larger blending region between tiles can be created, in effect, to reduce what would otherwise be a noticeable suddenness of differences of angular misalignment or translational transitions between tiles. Increased blending area can result in discontinuities of LED alignment between two tiles being less noticeable or unnoticeable.

Gaps between tile edges can have a blending region in a variety of configurations that can help reduce the visual artifacts associated with mismatches between adjacent tiles by spreading the mismatch over a larger area or over a longer distance in the area that is the blending region. Mismatches can be angular and translational spatial misalignments of rows and columns of LEDs in adjacent tiles. There can also be differences tile visual characteristics, such as in color, brightness, surface texture, angular projection of emitted light, or other visual mismatches between adjacent tiles.

One characteristic of the human vision system (HVS) is the ability to detect sudden spatial discontinuities even though the discontinuities may be low in magnitude. A sudden small change in color, light level, or alignment can have a high spatial frequency that the HVS can recognize. If a region between tiles extends the transition of the small visual difference between adjacent tiles over a larger area, then the spatial frequency of the discontinuity can be reduced and the ability of the HVS to detect the change can be reduced. Blending regions can reduce the spatial frequency of discontinuities. Increasing the blending region area with a greater spatial density is one approach, but alternate approaches are also possible.

One example of a situation in which a small visual difference can occur between adjacent tiles is when flat tiles that have a planar surface are positioned to create rectilinear curved screens that are curved either horizontally or vertically. A curved display can result in adjacent tiles having a slightly different angular position with respect to a viewer. Light emitted from a tile can vary based on the angle from which the tile is being viewed. If adjacent flat surface tiles of the same type of tile are positioned next to each other in which their respective surface is oriented on two different plane orientations, a viewer may view the same tile in two different positions and at two slightly different angles. This slight difference in angle can result in a viewer seeing a first level of light from the first tile and a second light level of light from the second tile where the first and second light levels are different. If the two adjacent tile edges are straight and do not include a blending region, the sudden spatial transition of light level at the adjacent tile edges can be easily perceived by a viewer. A blending region can spread the sudden transition in light level over a larger area to reduce or eliminate the perceived light level difference. If the display is a dome display surface, there can be both a horizontal curvature and a vertical curvature that use adjacent flat surface tiles positioned for causing angular viewing differences along adjacent vertical tile edges and along adjacent horizontal tile edges.

The blending techniques can be applied to a display that has multiple tiles, whether the display is a curved rectilinear surface or the display is a dome surface that has spherical curvature.

A viewer can easily perceive sudden spatial transitions along adjacent tile edges between areas of an orderly arrangement of LEDs, or sudden transitions in visual characteristics of LEDs that differ between areas of LEDs. Gaps between tile edges that are a continuous line can be more recognizable than gaps that are not in a straight line (e.g., zig zag line, sinusoidal line, interleaving profile, etc.) or broken up and distributed over a larger area such as gaps being redistributed over a blending region or area. Breaking gaps up into smaller pieces that are distributed over an area can allow for alternate compensation methods to be applied more effectively. Examples of alternate compensation methods include placing additional LEDs about the sections of gaps and using brightness uniformity algorithms to define the "brightness weighting" of light emitters over the area or blending region about the gap to ensure light uniformity about the gap and in the blending region appear consistent with light uniformity over other sections of the tile. These are different techniques in which the spatial frequency of the discontinuity or disturbance can be reduced by spreading out the discontinuity. Resampling of image content onto the varied spatial light emitting placement can further ensure continuity (i.e., reducing discontinuity) of images over the areas with seams to make them less perceptible. A blending region may not eliminate these differences, but it can provide a more gradual transition between the mismatches and can significantly reduce the perceptual impact of a viewer noticing the image artifacts associated with edge gaps and blending regions between tiles, which may be referred to as seams.

Figure 2:
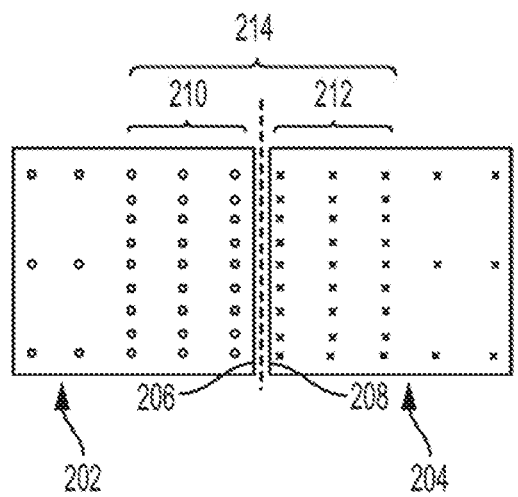
FIG. 2 is a front view of tiles with a blending region that includes a higher density of pixel at edges of the tiles according to one example of the present disclosure.
Figure 3:
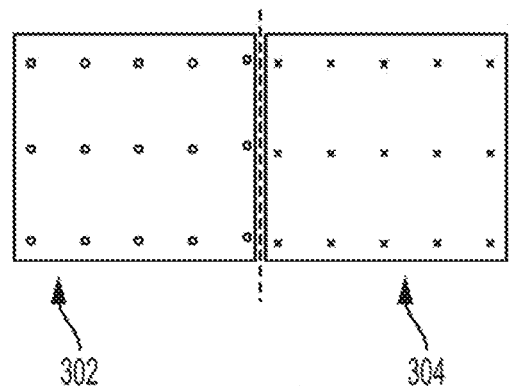
FIG. 3 is a front view of tiles according to another example of the present disclosure.

FIG. 2 shows a configuration of one blending example based on the spatial density of light emitting elements being higher at the edges of the tiles and thus at the area about the gap between tiles. Shown are two tiles 202, 204 positioned proximate to each other in which the tiles 202, 204 are aligned vertically so the rows of the LEDs (indicated by dots) on a first tile 202 are aligned with rows of LEDs (indicated by crosses) in a second tile 204. Both tiles 202, 204 have regions 210, 212 with greater spatial density of LEDs in the vertical direction about the vertical tile edges 206, 208 than the vertical spatial density of LEDs in the area away from the vertical tile edges 206, 208. The blending region 214 is formed by the region 210 of greater spatial density of LEDs in the first tile 202 and the region 212 of greater spatial density of LEDs in the second tile 204. In FIG. 3, two tiles 302, 304 of the same size are depicted, but the tiles 302, 304 do not have the vertically increased LED density near the vertical edges 306, 308 of the two tiles 302, 304, for comparison purposes.

Figure 4:
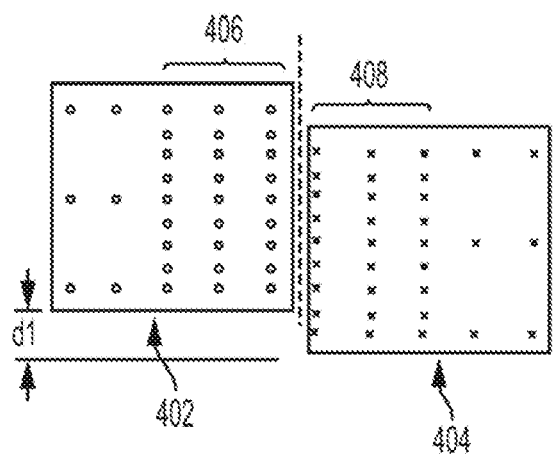
FIG. 4 is a front view of tiles vertically offset from each other and having a blending region according to one example of the present disclosure.
Figure 5:
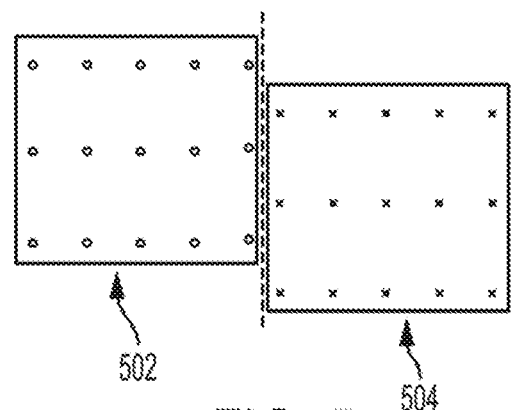
FIG. 5 is a front view of tiles vertically offset from each other according to another example of the present disclosure.
Figure 6:
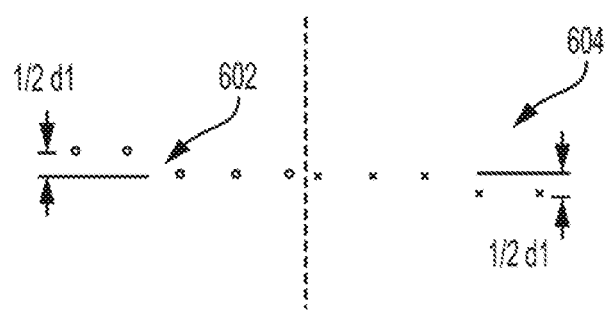
FIG. 6 represents a straight-line image with two transitions according to one example of the present disclosure.
Figure 7:
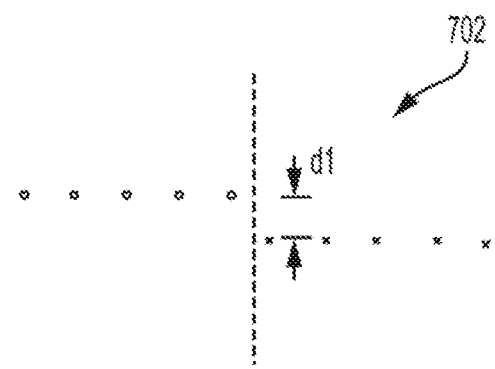
FIG. 7 represents a straight-line image with one transition according to one example of the present disclosure.

In FIGS. 4 and 5, first tiles 402, 502 and second tiles 404, 504 have a translational vertical shift between them with a displacement in an amount d1, as shown in FIG. 4. Thus, a straight horizontal line to be shown by the LEDs in the first tiles 402, 502 and the second tiles 404, 504 has a sudden discontinuity between the respective tiles of each FIG. To smooth out the vertical discontinuity transition of a horizontal line of LEDs from the first tile 402 to the second tile 404 in FIG. 4, the appropriate additional LEDs in the higher density regions 406, 408 can be allowed to emit light to depict a straight-line image as shown in FIG. 6. In FIG. 6, the LEDs that best represent the straight horizontal line have two transitions (e.g., transition "a" 602 and transition "b" 604) that are only ½ d1 vertical tile displacement. If the tiles 402, 404 have a greater density of LEDs about the tile edges, then the displacement between the LEDs can be further divided from d1 than the ½ d1 displacement used in the example. For example, if the vertical density of LEDs is doubled then there can be four equal transitions of a ¼ d1 magnitude spread out in some manner, such as evenly as possible, through the high density LED area (i.e., the blending region) to make the transition even more gradual. FIG. 7 shows a larger single sudden transition (i.e. transition "c" 702) that can occur at the tile edge area when not using increased LED density in the blending area.

The increase of LED density can also be applied to the top edge and the bottom edge of two tiles that are placed one above the other. Instead of the LED spatial density being increased vertically to produce more rows of LEDs by the tile edge for the vertical tile edge of horizontally adjacent tiles, more columns of LEDs can be positioned along the top edge and the bottom edge of stacked tiles, where one tile is positioned above the other tile to form the blending area suitable for compensating horizontal displacements between the vertically stacked tiles.

A calibration process can identify which LEDs in the blending region for each of the tile edges can be activated to provide the best way to have a uniform transition between adjacent tile areas to display an image.

A blending region between adjacent tiles can also have LEDs placed as close as possible to the tile edge in the blending region.

Figure 8:
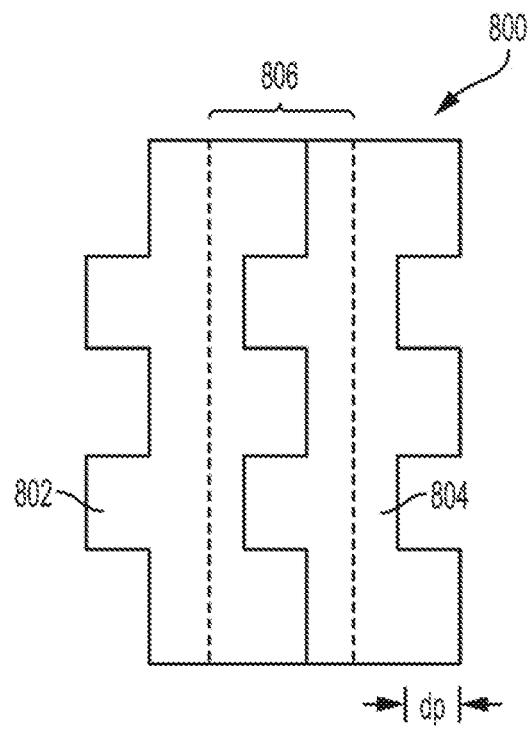
FIG. 8 is a front view of tiles with interlocking edges according to one example of the present disclosure.
Figure 9:
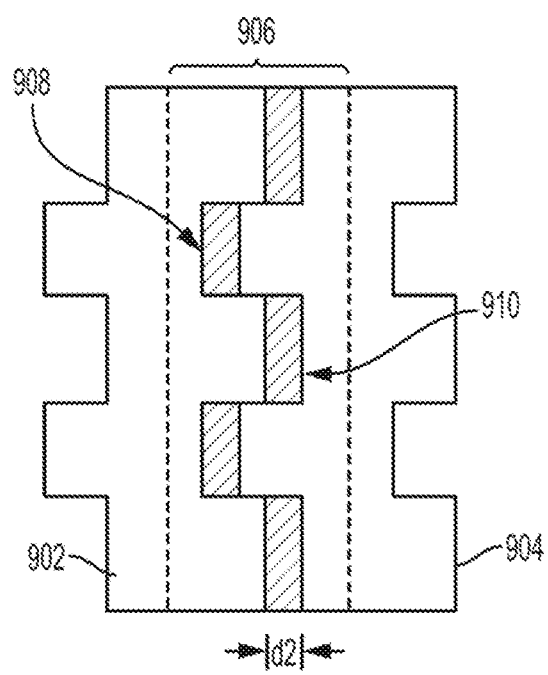
FIG. 9 is a front view of tiles with interlocking edges and gaps therebetween according to one example of the present disclosure.

The profile of the tile edge can be different than having one long straight edge between adjacent tiles for the full length of the tile. For example, FIG. 8 has a first tile 802 and an adjacent second tile 804 in a configuration 800. Each of the tiles 802, 804 can have an LED spatial density as described above where there is a greater LED spatial density at the edges of the tiles 802, 804 in the blending region 806 as compared to the LED spatial density away from the tile edge blending region 806. The LEDs are not depicted in FIG. 8, but the configurations described in FIG. 2 can be applied to the various combinations of edge profiles. The blending region 806 in FIG. 8 can be the areas of the tiles 802, 804 that include a tile edge profile. If there is an area near the edge that has higher spatial density of LEDs, this area may also form part of the blending region 806. For example, the blending region 806 can be the space between the dotted lines. In FIG. 8, the two tiles 802, 804 are aligned in that the two tiles 802, 804 butt up next to each other with no gap between the tiles 802, 804. In this situation, the LEDs can have no spatial misalignment. In FIG. 9, two tiles 902, 904 are horizontally displaced by a distance of d2, as shown. The gaps or spaces such as "space a" 908 and "space b" 910 in FIG. 9 that form as a result of the displacement become more distributed over the blending region 906 instead of being the one long gap when the edge was just one straight edge.

Figure 10:
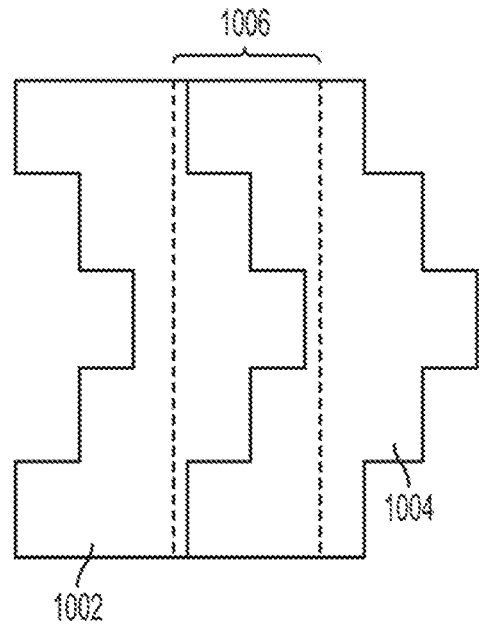
FIG. 10 is a front view of another example of tiles with interlocking edges.
Figure 11:
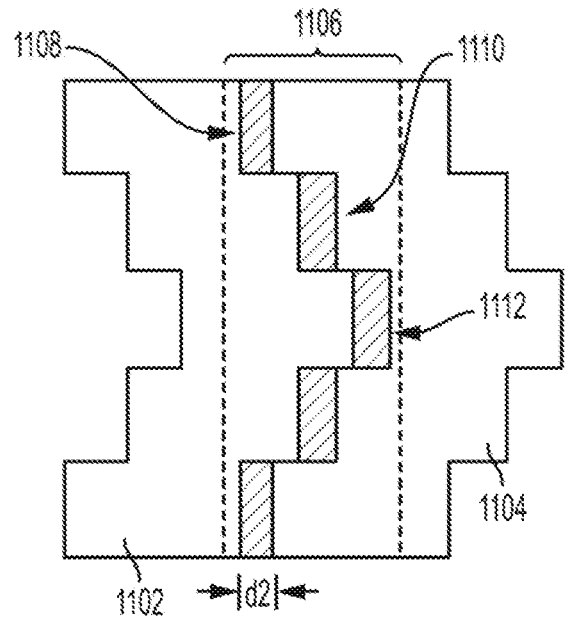
FIG. 11 is a front view of another example of tiles with interlocking edges and gaps therebetween.

FIG. 10 shows another tile edge profile in a blend ingregion 1006 that distributes the gap between two adjacent tiles 1002, 1004. FIG. 11 shows a displacement of d2 in the blending region 1106 between tiles 1102, 1104, but the spaces (i.e., space "a" 1108, space "b" 1110, and space "c" 1112) formed when the tiles are separated by a distance d2 are distributed over a larger blending region 1106. This distribution of a gap between tiles 1102, 1104 that is broken up into segments and distributed spatially throughout the blending region 1106 can reduce the perceived visual artifact associated with tile seams.

LEDs from two adjacent tiles can be spatially interleaved. The greater the distance of the finger length dp shown in FIG. 8, the greater the area of the spatial interleaving between the two adjacent tiles 802, 804 in the blending region 806 of LEDs. If there are differences, such as color balance differences or light level differences caused by different viewing angles to occur between tiles 802, 804, which may be in a curved display, these differences can become spatially interleaved or spatially intermixed by the tile edge profile in the blending region 806. Tile edges profiled that are interlocked as shown in FIG. 8 can create a blending region 806 with light emitters on the interleaving protrusions that are spatially positioned to create an area that has emitted light that alternates over the area between light coming from a first tile 802 with light coming from a second tile 804. Increasing the number of interleaving portions or making the interleaving portions longer can spread out visual differences between adjacent tiles and appear less noticeable to a viewer. Other differences can include slight differences in tile texture or tile surface look, or the light dispersion angle of the LEDs themselves on the two tiles 802, 804 being slightly different. Color balance of light emitters between tiles 802, 804 can become different when a tile is replaced that is next to a tile that has remained. The color differences can be related to differences in light emitters used on the tile being different or differences related to length of time the light emitters have been powered up causing the light emitters to age and in turn develop a shift in their spectral composition.

Increasing the number of interleaving features along a tile edge can result in an increased number of smaller gap areas that become distributed over the blending region. The increased number of distributed gaps in the blending region can further reduce a viewer's perception of visual artifacts associated with the space between adjacent tiles, in particular if all dimensions of the gap are within the threshold distance dimension.

From the above example, the spatial frequency of the discontinuity can be reduced by the shape of the edge profile, the number of interleaving protrusions, and by the length of the interleaving protrusions.

Figure 12:
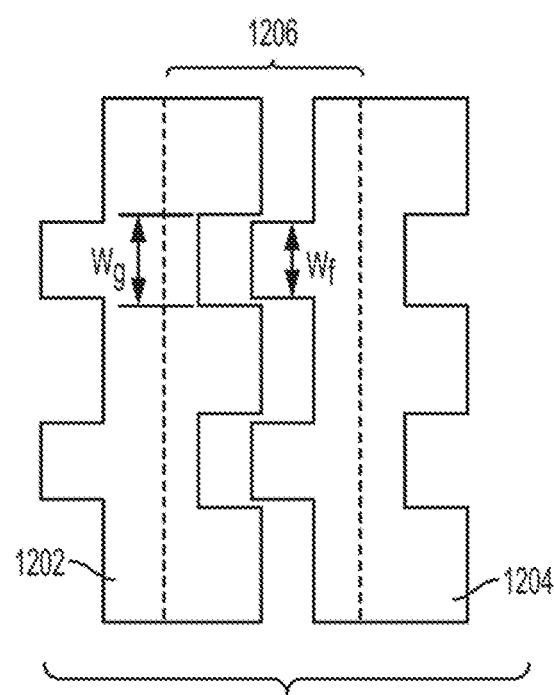
FIG. 12 is a front view of a further example of tiles with interlocking edges and gaps therebetween.

In some examples, the space width between finger protrusions can be larger than the width of the protruding finger for both adjacent tile edges, as shown in FIG. 12, where Wf is the finger width and Wg is the width of the gap in the blend region 1206 between a first tile 1202 and a second tile 1204. This can allow for easier fitting of tiles 1202, 1204 with less spatial precision when interconnecting many tiles to create a large display area. The increased gap width between fingers can be targeted to be within a desired threshold distance. For example, a tile edge that has finger widths and gap widths between fingers of the same dimension the widths can be altered within a threshold distance to reduce the precision with which two tiles 1202, 1204 need to be mounted next to each other. If a threshold distance is 2 mm, than the width of the gap between fingers can be increased by an amount that is the threshold distance or within the threshold distance. When adjacent tiles 1202, 1204 are mounted, the gap between the finger edges can vary from tile to tile in the range of 0 mm to 2 mm. Gap variations within the threshold distance may not be perceptible by a viewer positioned at the minimum distance for the threshold distance determined. Light emitting elements can be aligned within a threshold distance along one axis, such as the vertical axis, and can be aligned with a greater displacement in another axis, such as the horizontal axis. For example, a displacement that is 1 pitch in distance, where the pitch is significantly greater than the threshold distance, a greater spatial freedom to align tiles along a horizontal axis can be achieved, while keeping closer gap spacing along the vertical axis or greater spatial freedom along the vertical axis and closer gap spacing along the horizontal axis.

Figure 13:
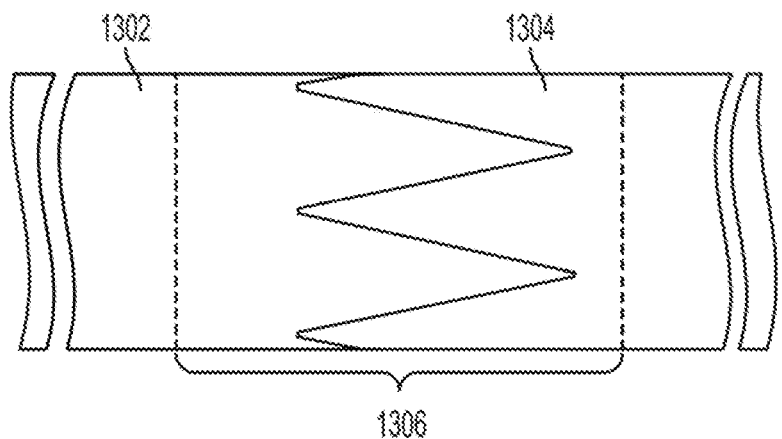
FIG. 13 is a front view of tiles with saw tooth edges according to one example of the present disclosure.
Figure 14:
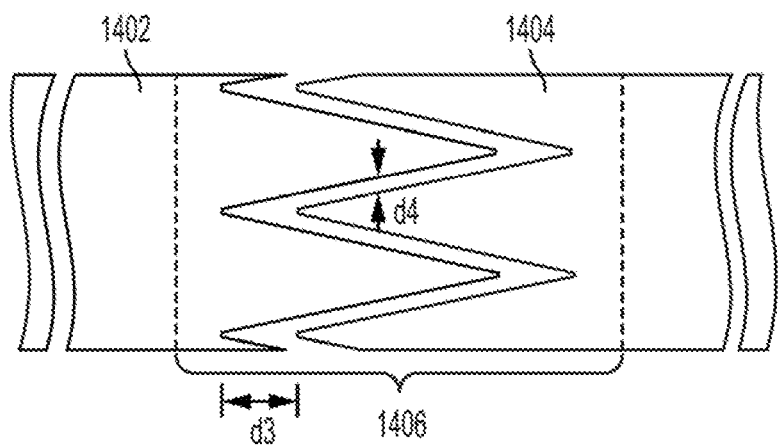
FIG. 14 is a front view of tiles with saw tooth edges and gaps therebetween according to one example of the present disclosure.
Figure 15:
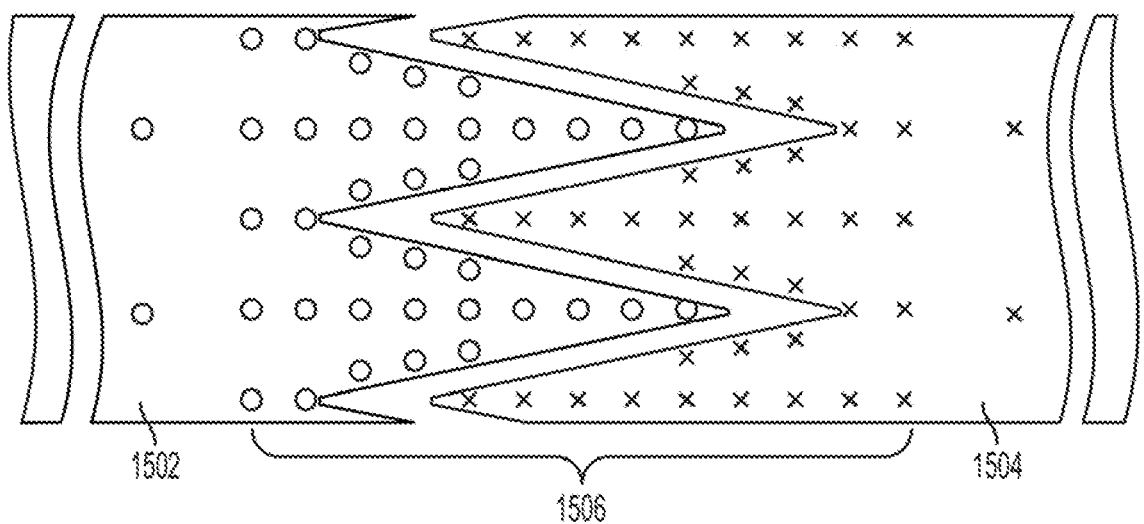
FIG. 15 is a front view of another example of tiles with saw tooth edges and gaps therebetween.

FIGS. 13-15 show another tile edge profile that takes further advantage of distributing the gap area between adjacent tile edges resulting from tile displacement between two adjacent tiles that can accommodate large horizontal or vertical tile displacements. In this example, any discontinuity between adjacent tiles can have an angular component with respect to the vertical and horizontal alignment grid of the light emitting elements in the two adjacent tiles. When used with higher spatial density of LEDs at the edges and calibration techniques, maximizing suppression of gap artifacts or other artifacts associated with the blending region that would otherwise be more noticeably visible can be suppressed.

Complementary first and second serrated sawtooth tile edge portions 1302, 1304 in FIG. 13 are fitted together with no gap. The blending region 1306 is indicated by the space between the two dashed lines and can be an area with increased LED spatial density. In FIG. 14, the first tile 1402 and the second tile 1404 are horizontally displaced by an amount d3. As a result of the displacement in the amount of d3, there is also a vertical gap created in the amount of d4 in the blending region 1406. Depending on the length of the triangular tooth of the serrated edge, the vertical gap of d4 can be dimensionally very small compared to the horizontal displacement of d3. Effectively, the horizontal gap is distributed over a long but narrow gap. The edges of the adjacent tiles can have high spatial density of LEDs, which can be used to aid with creating light uniformity around the gap area to compensate for LEDs that would have otherwise been positioned in the gap area. For smaller displacements of d3, the gap d4 may have a dimension that is less than a targeted visual acuity limit, such as a threshold distance. For example, if a targeted visual acuity dimension is 2 mm, the dimension d4 can be less than 2 mm for a horizontal tile displacement d3, where d3 may be as much as or more than an average pitch between two LEDs in the area outside of the high spatial density LED area. The resulting d3 displacement of this amount can result in the image being warped to match the newly shifted light emitting positions over the area of the shifted tiles. Resampling or warping the input image data can be necessary to prevent image distortion caused by display light emitters that no longer correspond with each other between shifted tiles.

Edges that are serrated or contoured can facilitate alignment between tiles by forming a natural interlocking feature. This can facilitate making alignment easier during the assembling of larger display areas with multiple tiles.

The serrated edges are not limited in shape to what has been disclosed. For example, the edges can have a sinusoidal profile, a trapezoidal profile, random shaped edge or other shape that is more complex in profile than discussed or a combination of different edge profiles.

Another variation related to the blending region relates to the arrangement of the LEDs in the high spatial density region. For example, the edge profile may benefit from LEDs positioned in a line profile that is at right angles to the edge profile that is a different orientation than the LEDs positioned in the area outside the blending region within the tile. Alternatively, the LEDs can be positioned in a random manner in the blending region and in an orderly manner in the area that is within the tile but outside of the blending region. LEDs can also be positioned in the blending region as close as possible to the tile edge for a portion of the tile edge, as shown in FIG. 15. The light emitters on the first tile 1502 are shown as dots and the light emitters on the second tile 1504 are shown as crosses. At the serrated edge, there are a number of light emitters positioned along the edge as close as possible to the edge. Other areas of the blending region 1506 show the light emitters spaced out more evenly. Outside of the blending region 1506, the light emitters are spaced out at least with twice the pitch of the light emitters in the blending region 1506.

Noticeability of seams between tiles can be further reduced by having areas in the tile make gaps or blending regions (e.g., seams) that are regular in profile look less regular in profile. For example, a seam pattern on a display that has a rectangular grid appearance can be made to appear less like a rectangular grid by adding angular seams to form triangular seams, which can be considered in making the adjacent tile seam pattern stand out less. For example, FIG.

Figure 21:
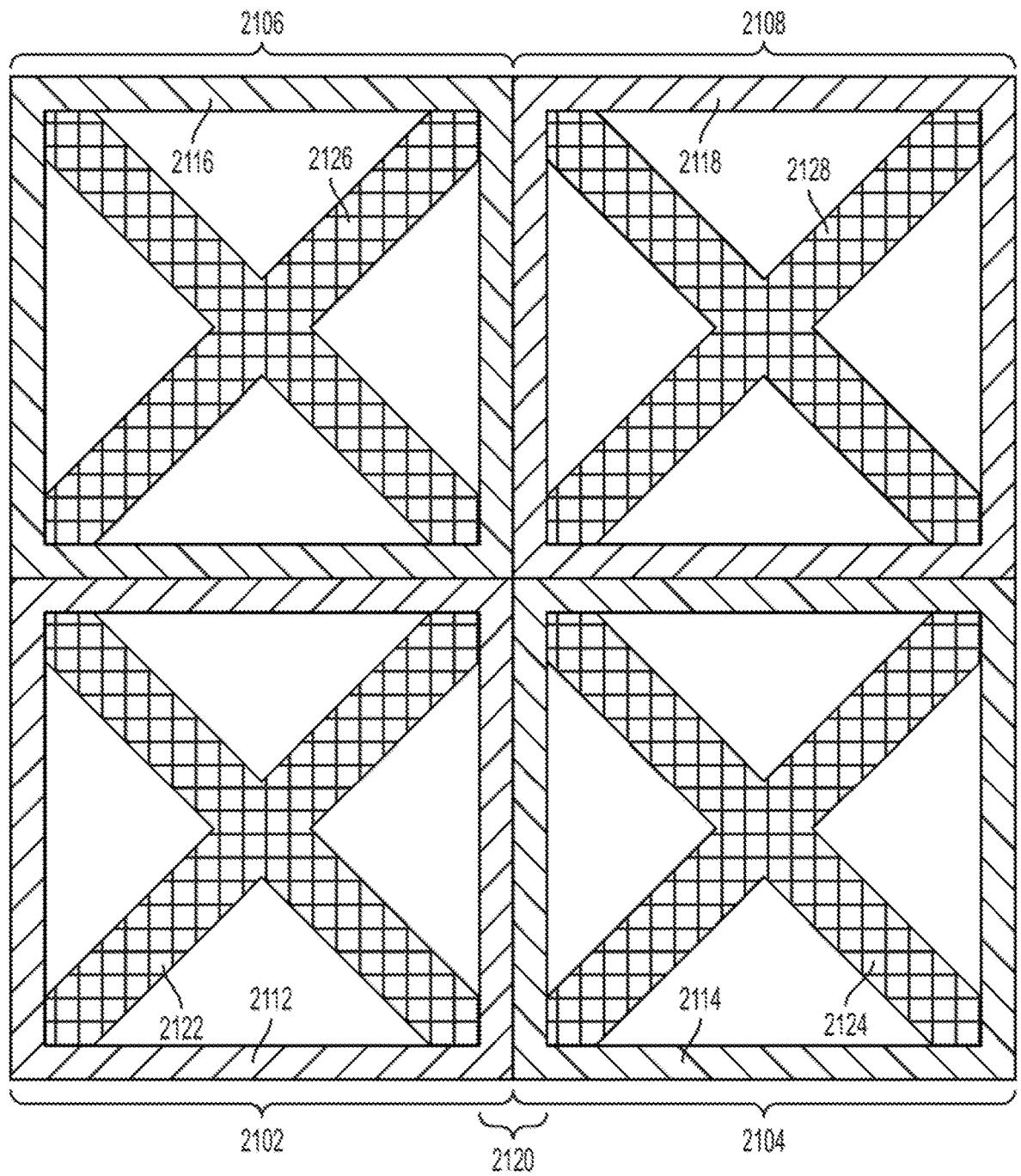
FIG. 21 schematically shows four adjacent tiles with angular seam patterns according to one example of the present disclosure.

21 shows four tiles 2102, 2104, 2106, 2108 positioned together. Each of the tiles 2102, 2104, 2106, 2108 has an area near the edge shown with single crosshatched edges 2112, 2114, 2116, 2118. The edges 2112, 2114, 2116, 2118 can create a blending region 2120 that has a higher density of light emitting elements than the area outside of the blending region 2120, along with complementary edge profiles with other tiles 2102, 2104, 2106, 2108. An angular seam pattern 2122, 2124, 2126, 2128 is included within each of the tiles 2102, 2104, 2106, 2108. The angular seam patterns 2122, 2124, 2126, 2128 can have the same density and pattern of light emitting elements as the blending region 2120 between the tiles 2102, 2104, 2106, 2108 but without the complementary edge profile of the joint between the tiles 2102, 2104, 2106, 2108 and a different density of light emitting elements as other areas of the tiles 2102, 2104, 2106, 2108. The angular seam patterns 2122, 2124, 2126, 2128 can, in effect, form additional blending regions that emulate the blended regions 2120 between the tiles 2102, 2104, 2106, 2108 to create a camouflage effect with the blending region 2120. To emulate the blended region 2120, a characteristic of the blending region 2120 can be emulated. For example, the light emitting density can be one characteristic in which the light emitting density of the additional blending has a next effect of being equivalent as the light emitting density of the blended region 2120 between tiles 2102, 2104, 2106, 2108. Another example can include creating a spacing between light emitting elements in the additional blended region that characterizes a physical gap of the space between tiles 2102, 2104, 2106, 2108 in the blended region. Although the angular seam patterns 2122, 2124, 2126, 2128 are shown as angular in FIG. 21, additional seam patterns according to other examples can be a different shape or pattern. For example a rectangular section at the center of the tile with greater density of light emitters or an additional pattern that has horizontal or vertical seams that are parallel to the existing seams or blending regions between tiles. This solution can be more effective in combination with other suppression techniques associated with gaps between tile edges and blending regions to further improve display quality.

Dark or black image scenes, such as outer space scenes, can allow differences in adjacent tiles to be viewable. For example, if light emitters in different tiles have a different minimum light level or the reflective surface in the blending region that is different than the reflective surface of the rest of the tile area, visible artifacts may be viewable between adjacent tiles. Having increased spatial density of light emitters in the blending region can allow for increased accuracy of spatial brightness distribution control in the blended region. The increased accuracy of spatial brightness distribution in the blending region can allow for smoother transition between different minimum light levels of adjacent tiles.

The space between light emitters can be a black surface with a diffuse surface that may reduce specular reflections so that the transition between tile surface textures is minimized, such as transitions originating from tiles being mounted with angular misalignments with respect to the plane of the display surface and hence emit narrow angle specular reflections in different directions. The tile surface can also have different profiles of black or low gain to camouflage other discontinuities, such as the differences in the reflective surface of areas, with greater density of light emitter elements (blending regions) compared to other areas that have a lower density of light emitters (i.e., areas that are not blending regions). The reflective surface area of the tiles, between light emitting elements, can be tailored such that there is reflective uniformity across the surfaces of adjacent tiles. A blending region can be between adjacent tiles to minimize visual artifacts perceived by the HVS using one or a combination of different methods (some of which are listed below) where the visual artifacts that can be caused by discontinuities of small differences in light emitting characteristics (e.g., light level, color, tile surface texture, and tile surface reflectance) between adjacent tiles.

By modifying light emitter positions with respect to the tile edge:
   Adjusting light emissions of adjacent tile light emitters that have a pitch that is less than a minimum threshold distance.
   Increasing the spatial density of light emitters along adjacent tile edges.
   Increasing the spatial density of light emitters in the blending region that is an area next to the tile edge.
   Improving brightness uniformity across adjacent tile edges and blending regions by calibrating adjacent tiles with brightness uniformity algorithms.
By modifying adjacent tile edges:
   Configuring the adjacent tile edges to have complementary protrusions with a particular shape (e.g., sawtooth profile, sinusoidal profile, interleaving block profile, etc.).
   Increasing the width of the blending area by increasing the length a tile edge protrusion goes into an adjacent tile area.
   Increasing the density or frequency of complementary protrusions over a given length of adjacent tile edge.
   Orienting the gaps between adjacent tiles so that the tile edge lines form an angle that is not parallel or 90 degrees with respect to any of the rows and columns of light emitting elements on the tile.
   Creating additional blending regions within the tile area but outside of the blending regions at the tile edges where the additional blending regions create a camouflage effect with the tile edge blending regions. For example, the camouflaging regions can have a spatial density of light emitting elements that is different than the spatial density of light emitting elements in other areas of the tile.
By aligning image content intended for a spatially defined array of light emitting elements with light emitting elements where a portion is not a spatially defined array of light emitting elements.
Decreasing the discontinuity of image content between adjacent tiles and the blending region by resampling received image content to align to the actual position of the light emitting elements on adjacent tiles and the blending region.

A display system with tiles can be calibrated to ensure visual uniformity (e.g., with respect to brightness and color) of the light emitters across the tiles with blending regions and to ensure the image content intended for uniform light emitting grid arrays corresponds to light emitting elements in a display system that have regions and tiles that do not correspond in alignment with a uniform grid array of light emitters.

Figure 16:
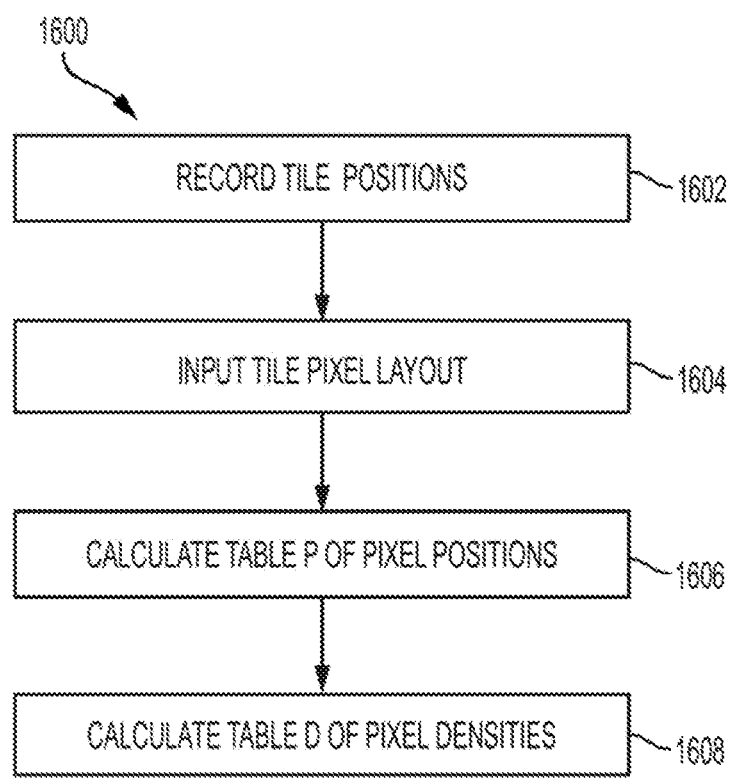
FIG. 16 is flow chart of a process for calibrating image data for an LED display according to one example of the present disclosure.
Figure 17:
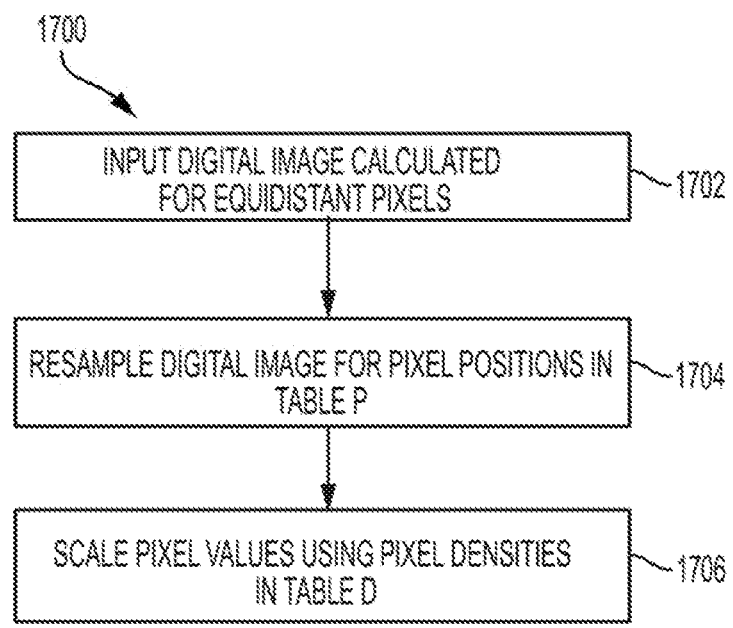
FIG. 17 is a flow chart of a process for modifying an image based on calibration information according to one example of the present disclosure.

A calibration process providing data for pre-processing images may be performed to reduce or eliminate seam visibility. The calibration process can be performed, for example, on installation of the LED display, replacement or maintenance of one or more tiles, or after the LED display is physically influenced, such as by objects contacting the LED display. FIGS. 16 and 17 are flowcharts of examples of processes for calibrating for an LED display. The examples are described with respect to a monochrome display for simplicity, but the processes can also be applied to displaying color on an LED display.

In block 1602 in FIG. 16, tile positions are recorded. For example, angular misalignment orientations of tiles of an LED display, as mounted, can be captured via a camera that is viewing the display tiles or by other means obtained via manually measuring distances via angular measurement tools. The position of the tiles may be center positions of tiles defined in a display area. When using a camera, at least one recorded image of the display's surface can be captured while an alignment image is being displayed on the LED display. The alignment image may include a tracking pattern and a tile identifier encoded as a pixel pattern for each tile in the display. A pixel being one light emitting element (LED) or a cluster of light emitters that represent one light emitting element. The tracking pattern may include at least one feature designed for detecting the center and the orientation of a tile. An example of an identifier is a bar code, such as a QR (Quick Response) code. In another example, recorded images that each includes an alignment image with a tracking pattern and a tile identifier are captured for a subset of the tiles in the LED display.

In block 1604, the tile pixel layout is read by a processing device. For example, the processing device may receive the tile pixel layout from data storage. The pixel layout coordinates may be identical as another tile or all tiles for the tiles. The pixel layout data may include X and Y coordinate positions of each pixel on a tile relative to a center position of the tile.

In block 1606, the processor device calculates a table "P" in which table "P" represents the position of all pixels in an area that is the LED display or a portion of the display. The pixel positions in the table may be calculated from the data of recorded positions and angular orientations of tiles in the LED display obtained in block 1602 and from the tile pixel layout data obtained in block 1604. The calculation of positions of pixels in the display may include performing a translation of X and Y positions of pixels on a tile relative to a center position of the tile in the display area. It may further include rotating the X and Y positions around a center position of a tile in the display area.

In block 1608, the processor device calculates a table "D" in which table "D" represents the relative pixel densities at positions of pixels in the display. Calculating table D can include using a point density function (i.e., pixels may be assumed to be point light sources). The point density function may simulate the visual acuity limit (e.g., threshold distance) of a viewer located at a distance from the display (Dobs) when a viewer can no longer resolve spatial differences between display pixels that is a minimum distance of Dobsmin that the display is designed for. An example of the point density function is a Gaussian averaging function. The Gaussian averaging function may have a standard deviation equal to tan(1/60)×Dobsmin. An example of Dobsmin is 7 m, in which case the standard deviation is tan(1/60)×7 m=2.0 mm.

Additionally or alternatively, the standard deviation may be adjustable and a technician may observe a uniformly illuminated image displayed after the calibration procedure is completed, adjust the standard deviation based on how uniform the image looks, perform another calibration procedure, re-adjust the standard, observe the result and repeat this in an iterative process until the image viewed is satisfactory. Calculating table D may further include identifying the pixel in the display for which the pixel density is smallest and dividing the pixels in the display with the smallest pixel density, thereby normalizing the table D by making the pixel density values in table D relative to the lowest density on the display so that the lowest density value in the Table D is 1 and all other density values are higher. Identifying the pixel with the smallest value may include selecting any pixel not near the edge of a tile. Alternatively, calculating table D may include displaying an image where pixels have essentially uniform brightness and performing a manual adjustment of pixels along at least one tile edge of at least one tile while observing the edge from a distance equal to or greater than Dobsmin until the tile boundary appears less visible. Manual adjustment may include adjusting all pixels along at least one edge at the same time and may further include adjusting a brightness distribution that may be a gradient function. The gradient function may affect pixels at an edge with a gradient direction along the edge.

FIG. 17 is a flow chart of a process for modifying an image based on calibration information according to one example. In block 1702, a digital image is received from, for example, a storage medium. The data of the digital image may be pre-configured for display on an LED display with LEDs that are uniformly distributed to be equidistant from each other.

In block 1704, the digital image is resampled using the positions of pixels in the display stored in Table P calculated in FIG. 16. The resampled image may be calculated using a bicubic, bilinear, Lanczos or Mitchell resampling.

In block 1706, an output image is calculated by dividing the resampled image by the pixel density values in Table D calculated in FIG. 16. Each pixel in the resampled image may be divided by the corresponding pixel density value in Table D, thereby providing an output image that, when displayed by the tiles of the LED display, can result in less visibility of seams between the tiles than if the provided digital image data intended for displays with uniform distribution of the LEDs (pixels) over a display area was displayed without the pre-processing 1700.

Figure 18:
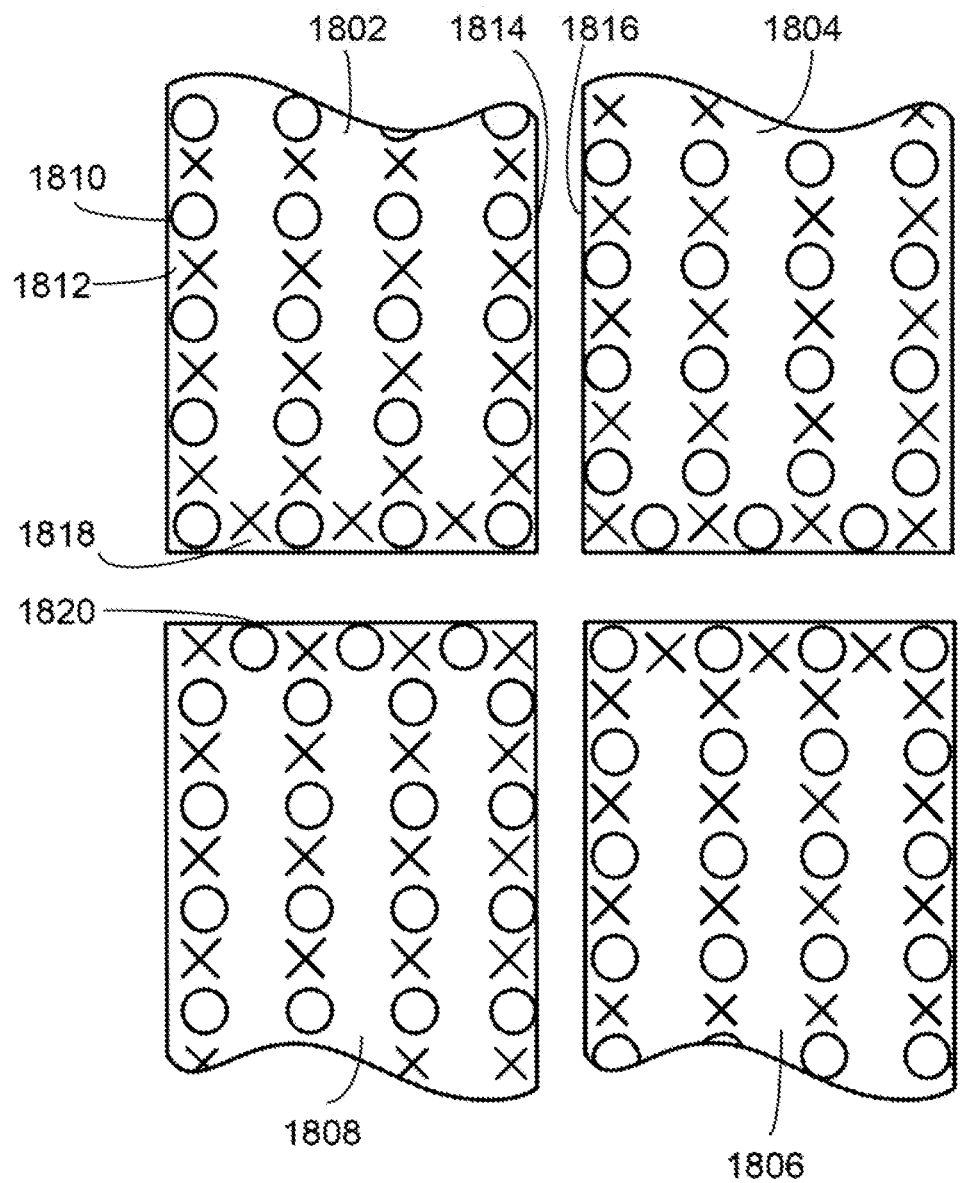
FIG. 18 schematically shows four adjacent tiles according to one example of the present disclosure.

FIG. 18 schematically shows four adjacent tiles 1802, 1804, 1806, 1808 according to one example. The tiles 1802-1808 may be configured with a pixel pattern supporting 3D with passive eyewear, such as polarized glasses or spectral filter glasses. Each tile includes a first set of LEDs 1810 (represented by circles) having a first set of light characteristics, and a second set of LEDs 1812 (represented by crosses) having a second set of light characteristics. An observer may wear a pair of glasses that allows light from the first set of LEDs 1810 to be transmitted to a first eye of the observer and light from the second set of LEDs 1812 to be essentially blocked from reaching the first eye of the observer. And the glasses can allow light from the second set of LEDs 1812 to be transmitted to a second eye of the observer and light from the first set of LEDs 1810 to be essentially blocked from reaching the second eye of the observer. A first perspective image may be observed by the first eye of the observer and a second perspective image may be observed by the second eye of the observer such that the observer perceives the images stereoscopically.

Each LED may have any dimension. In one example, the dimensions of each LED are 1 mm×1 mm, the horizontal spacing between adjacent edges of the LEDs on the same tile may be 1 mm, and the vertical spacing between adjacent edges of the LEDs on the same tile may be essentially 0 mm. The horizontal distances between the LED centers may be 2 mm and the vertical distances between the LED centers can be 1 mm (e.g., the LEDs are arranged in a matrix pattern having a horizontal pitch of 2 mm and a vertical pitch of 1 mm). An LED located in a row of the matrix pattern that is closest to an edge of a tile and an LED located in a column of the matrix pattern that closest to an edge of a tile may be referred to as an "edge LED"(1814, 1816). The tiles 1802, 1804 may be mounted with target mounting positions so that the distance between a first edge LED 1814 on a first edge and a second edge LED 1816 on a second edge facing the first edge is 0.5 mm, and the mounting tolerance may be 0.25 mm. The maximum distance across a tile boundary between two adjacent edge LEDs can be 0.5 mm+2×0.25 mm=1 mm.

In FIG. 18, the tiles 1802-1808 are shown as mounted so that the spacing between tiles 1802-1808 is the maximum distance such that the spacing is equal to the spacing between pixels of the same tile, and to the width and the length of a pixel.

In the vertical direction, LEDs may be arranged in a pattern, alternating between the first set of LEDs 1810 and the second set of LEDs 1812. The first set of LEDs 1810 can be arranged in a first-eye matrix pattern with a horizontal and vertical pitch of, for example, 2 mm, and the first eye of the observer can view the first-eye matrix pattern. The second set of LEDs 1812 can be arranged in a second-eye matrix pattern with a horizontal and vertical pitch of, for example, 2 mm, and the second eye of the observer can view the second-eye matrix pattern.

The maximum distance across a tile boundary between two adjacent LEDs in a vertical direction of 1 mm may result in a vertical pitch across the boundary of 2 mm, which is double the vertical pitch in areas outside of boundaries. This may result in a significantly lower density of LEDs at boundaries resulting in visible dark seams. To compensate, additional edge LEDs 1818, 1820 may be interspersed between edge LEDs in vertical columns of LEDs at top edges and bottom edges of tiles. The additional edge LEDs 1818, 1820 can have characteristics corresponding to the first set of LEDs 1810 at edges where edge LEDs in the columns correspond to the second set of LEDs 1812 so that the density of LEDs in the first set of LEDs 1810 is increased at the boundary. And the additional edge LEDs 1818, 1820 can have characteristics corresponding to the second set of LEDs 1812 at edges where edge LEDs in the columns correspond to the first set of LEDs so that the density of LEDs corresponding to the second set of LEDs are increased at the boundary. For example, the density of LEDs belonging to both sets of LEDs at tile edges may be maximized so that the densities of LEDs of both characteristics across boundaries are equal to or higher than the densities in areas on the tiles away from boundaries.

Figure 19:
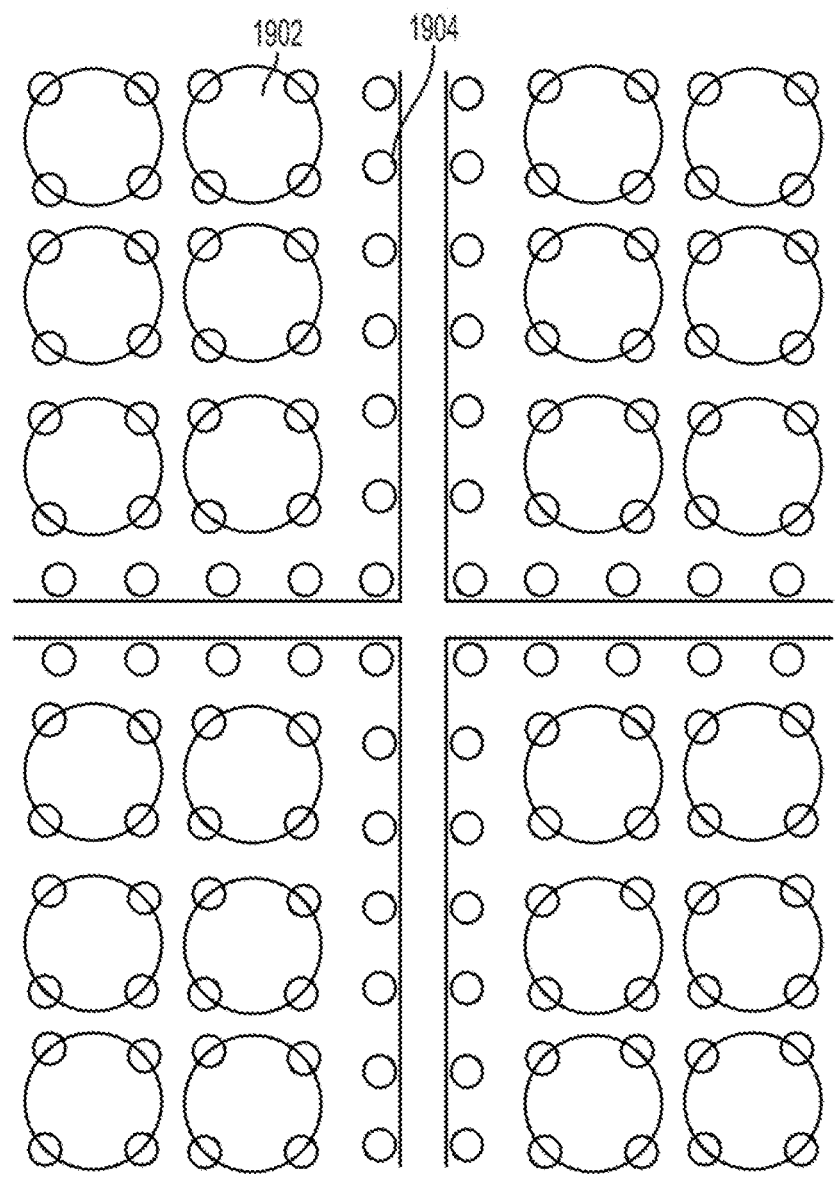
FIG. 19 schematically shows the same configuration as in FIG. 18 without LEDs corresponding to a different polarization according to one example of the present disclosure.

FIG. 19 schematically shows the same configuration as in FIG. 18, where the second set of LEDs is not shown. Additionally, larger circles 1902 indicate how non-edge LEDs may be grouped into pixels that include four LEDs that are controlled by the same pixel code value provided to the display. This may help where a display has a higher number of LEDs than the resolution of an image to be displayed. Pixels at edges 1904 may each be separately controlled to allow precise control of the brightness levels across boundaries by the calibration transformation and reduce or eliminate visible seams.

Figure 20:
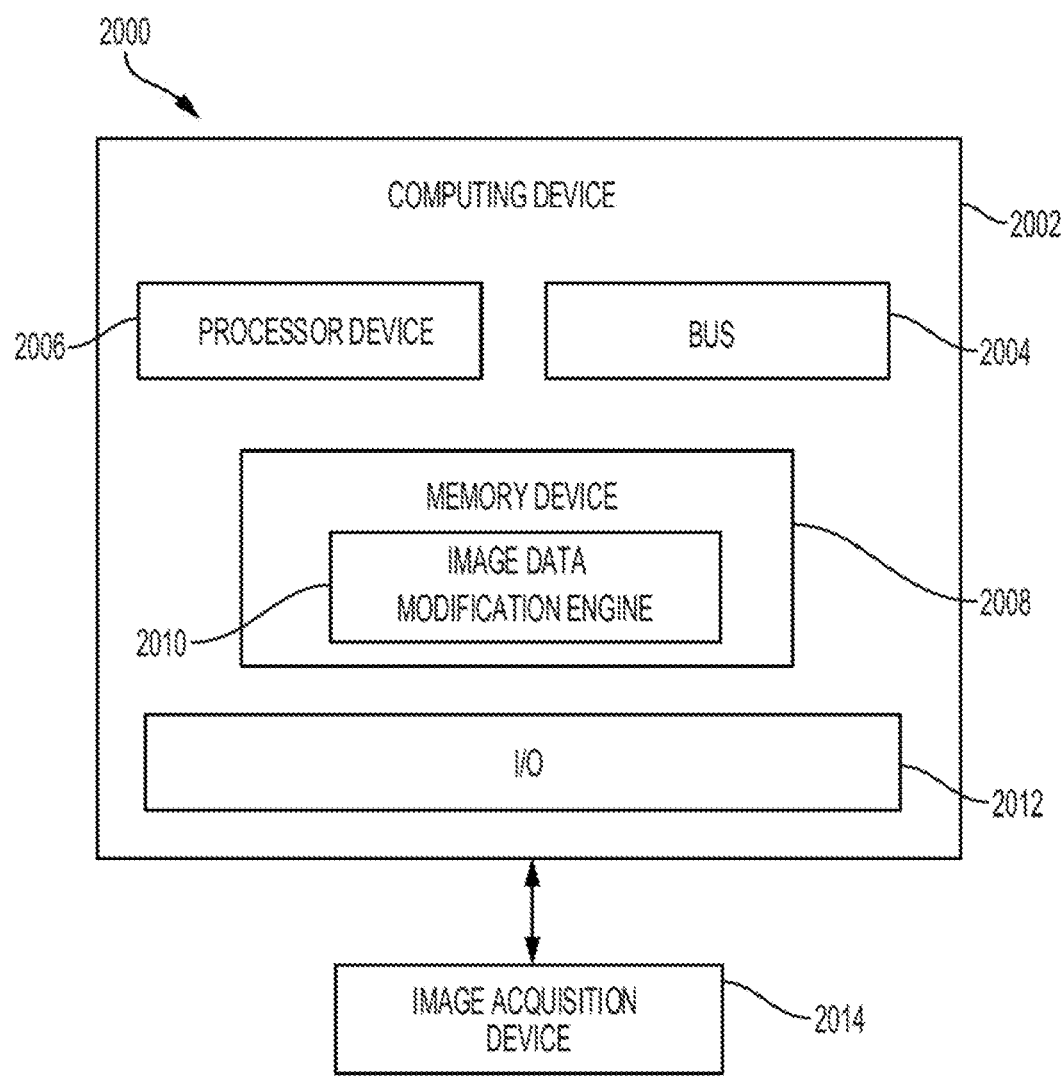
FIG. 20 is a block diagram of a system for calibrating image data for display on an LED display according to one example of the present disclosure.

FIG. 20 is a block diagram of a system 2000 for calibrating image data for display on an LED display according to one example of the present disclosure. The system 2000 can be used to perform a calibration process on image data for display by an LED display in which tiles of the LED display are mounted within a threshold distance with respect to each other. The system 2000 includes a computing device 2002 and an image acquisition device 2014.

An example of the image acquisition device 2014 is a camera. The image acquisition device 2014 can capture images of the LED display, including position information for the tiles. The images, or at least the position information, can be provided to the computing device 2002.

Examples of the computing device 2002 include a server device and a projection server. The computing device 2002 includes a processor device 2006, a bus 2004, a memory device 2008, and an input/output module 2012. Examples of the processor device 2006 include an ASIC, a microprocessor, a DSP, and any type of circuitry that can perform operations specified by instructions to cause the computing device to perform actions. The processor device 2006 can execute instructions stored in the memory device 2008. For example, the memory device 2008 includes an image data modification engine 2010 that, when executed by the processor device 2006, can cause the computing device 2002 to perform a calibration process, such as the processes specified in FIGS. 16-17. The memory device 2008 may be any type of non-transitory computer-readable storage medium.

The bus 2004 can include electronic, optical, logic, communication protocols, etc. for transferring data, signals, and information between the components of the computing device 2002. The input/output module 2012 may include a port and communication protocol for communicating with devices (e.g., the image acquisition device) external to the computing device.

As used below, any reference to a series of examples is to be understood as a reference to each of those examples disjunctively (e.g., "Examples 1-4" is to be understood as "Examples 1, 2, 3, or 4").

Example 1 is an LED display system for displaying content in a theatre, the LED display system comprising: a plurality of tiles mounted within a threshold distance with respect to each other to form an LED display; and a processor device configured to modify image data to be displayed by the LED display based on position information of the plurality of tiles.

Example 2 is the LED display system of example(s) 1, further comprising: an image acquisition device configured to capture positions of the plurality of tiles, wherein the processor device is configured to modify the image data by: generating a tile pixel layout from the positions of the plurality of tiles; calculating pixel positions and pixel densities of each tile of the plurality of tiles; receiving an input digital image having equidistant pixel data; resampling the input digital image using the pixel positions of each tile of the plurality of tiles to form a resampled digital image; and scaling pixel values in the resampled digital image using the pixel densities of each tile of the plurality of tiles to form a modified digital image to be displayed by the LED display.

Example 3 is the LED display system of example(s) 1-2, wherein at least some tiles of the plurality of tiles have a density of LEDs for at least some edges of each tile that is greater than the density of LEDs in a center of the respective tile.

Example 4 is the LED display system of example(s) 1-3, wherein each LED on a tile of the plurality of tiles that is at an edge of the tile is independent controllable as compared to other LEDs at the edge of the tile, wherein at least some non-edge LEDs on the tile are controllable as a group of LEDs.

Example 5 is the LED display system of example(s) 1-4, wherein the threshold distance is based on a distance between the LED display and a closest row for patron seating to the display.

Example 6 is an LED display, comprising: a plurality of tiles mounted within a threshold distance with respect to each other, at least some tiles of the plurality of tiles being misaligned with respect to each other and comprising: a density of LEDs positioned at an edge of the respective tile that is greater than the density of LEDs in a center of the respective tile.

Example 7 is the LED display of example(s) 6, wherein the LED display is configured to display digital image data that has been modified using a calibration process that involves capturing a position of tiles of the plurality of tiles.

Example 8 is the LED display of example(s) 7, wherein the calibration process comprises: capturing positions of the plurality of tiles, generating a tile pixel layout from the positions of the plurality of tiles; calculating pixel positions and pixel densities of each tile of the plurality of tiles; receiving an input digital image having equidistant pixel data; resampling the input digital image using the pixel positions of each tile of the plurality of tiles to form a resampled digital image; and scaling pixel values in the resampled digital image using the pixel densities of each tile of the plurality of tiles to form a modified digital image data to be displayed by the LED display.

Example 9 is the LED display of example(s) 8, wherein the calibration process further comprises performing a brightness calibration of LEDs of the LED display.

Example 10 is an LED display, comprising: a plurality of tiles mounted within a threshold distance with respect to each other, at least some tiles of the plurality of tiles being misaligned with respect to each other; and an LED positioned at an edge of a tile of the plurality of tiles, the center of the LED being closer to the edge than half of a target display pitch minus a tolerance, the tolerance being a maximum deviation from the target display pitch that is allowable between two pixels before a visual artifact results.

Example 11 is a light emitting display comprising: a first tile and a second tile mounted to form a light emitting display, the first tile being misaligned with the second tile to form an area with a gap, wherein the first tile includes a first edge having a first edge profile with at least one first protrusion, wherein the second tile includes a second edge having a second edge profile with at least a second protrusion, the second edge profile being complementary to the first edge profile, the first tile and the second tile forming a blending region in which the gap is distributed.

Example 12 is the light emitting display of example(s) 11, wherein each of the first tile and the second tile comprises light emitters positioned at the edge of the respective tile having a density that is greater than the density of light emitters in a center of the respective tile.

Example 13 is the light emitting display of example(s) 12, wherein the first edge profile is a sawtooth profile.

Example 14 is the light emitting display of example(s) 11-13, wherein the gap is formed in at least two separate areas.

Example 15 is the light emitting display of example(s) 11-14, wherein the blending region includes light emitting elements from the first tile and light emitting elements from the second tile that are spatially interleaved with the light emitting elements from the first tile.

Example 16 is the light emitting display of example(s) 11-15, wherein the blending region across the first tile and the second tile has a distance in a range of one light emitting element to ten light emitting elements.

Example 17 is the light emitting display of example(s) 11-16, wherein the first tile and the second tile are alignable using the first edge profile and the second edge profile.

Example 18 is the light emitting display of example(s) 11-17, wherein the first tile and the second tile are part of a curved display surface, and have flat and straight surfaces that include the blending region.

Example 19 is the light emitting display of example(s) 11-18, wherein a distance between centers of adjacent light emitting elements is the same or less than a threshold distance that is a minimum visual acuity determined by an observer's distance from the display.

Example 20 is the light emitting display of example(s) 19, wherein a horizontal alignment between the first edge and the second edge is based on a first-edge emitter element and a second-edge emitting element that is adjacent to the first-edge emitter element that are positioned at a maximum allowable pitch that is a distance between centers of the first-edge emitter element and the second-edge emitter element, wherein a vertical alignment between the first edge and the second edge is based on a third-edge emitter element and a fourth-edge emitter element that are positioned at a minimum allowable pitch.

Example 21 is the light emitting display of example(s) 20, wherein the minimum allowable pitch is an amount that is equal to or less than the threshold distance.

Example 22 is the light emitting display of example(s) 20, wherein the maximum allowable pitch is based on an average pitch between light emitting elements on the first tile and the second tile, and on the threshold distance.

Example 23 is a light emitting display comprising: a first tile comprising a first edge on which is a first light emitting element; and a second tile comprising a second edge on which is a second light emitting element and positioned with respect to the first tile such that the first edge and the second edge form a blending region.

Example 24 is the display of example(s) 23, wherein the first emitting element is configured to output light with a first characterization and the second emitting element is configured to output light with a second characterization, wherein the first characterization has a difference with the second characterization that transitions over the blending region between the first tile and the second tile to cause a spatial frequency of the difference to be spread out over the blending region.

Example 25 is the display of example(s) 24, wherein the first characterization and the second characterization are at least one of: color of light; brightness of light; or angle of emitted light.

Example 26 is the display of example(s) 23-25, wherein the first edge and the second edge define a gap therebetween, the first edge being adjacent to the second edge, a size of the gap transitioning over the blending region between the first tile and the second tile to cause a reduction in spatial frequency of the gap within the blending.

Example 27 is the display of example(s) 23, wherein each of the first tile and the second tile include seam patterns within the first tile and the second tile, the seam patterns being configured to emulate a characteristic of the blending region.

Example 28 is the display of example 27, wherein the characteristic includes a density of light emitting elements that is an equivalent density of light emitting elements in the blending region.

The foregoing description of certain embodiments, including illustrated embodiments, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A light emitting display system for displaying content in a theatre, the light emitting display system comprising:
a plurality of tiles mounted within a threshold distance with respect to each other to form a light emitting display, the plurality of tiles including a first tile having a first edge and a second tile having a second edge positioned within the threshold distance with respect to the first edge such that light emitting elements at the first edge have an average pitch with respect to adjacent light emitting elements at the second edge that is different than an average pitch between light emitting elements that are solely within the first tile;
an image acquisition device configured to capture positions of the plurality of tiles; and
a processor device configured to modify image data to be displayed by the light emitting display based on position information of the plurality of tiles, wherein the processor device is configured to modify the image data by:
generating a tile pixel layout from the positions of the plurality of tiles;
calculating pixel positions and pixel densities of each tile of the plurality of tiles;
receiving an input digital image having equidistant pixel data;
resampling the input digital image using the pixel positions of each tile of the plurality of tiles to form a resampled digital image; and
scaling pixel values in the resampled digital image using the pixel densities of each tile of the plurality of tiles to form a modified digital image to be displayed by the light emitting display.

2. The light emitting display system of claim 1, wherein at least some tiles of the plurality of tiles have a density of light emitting elements for at least some edges of a respective tile that is greater than a density of light emitting elements in a center of the respective tile.

3. The light emitting display system of claim 1, wherein each light emitting element on a tile of the plurality of tiles that is at an edge of the tile is independently controllable, wherein at least some non-edge light emitting elements on the tile are controllable as a group of light emitting elements.

4. The light emitting display system of claim 1, wherein the threshold distance is based on a distance between the light emitting display and a closest row for patron seating to the light emitting display.

5. The light emitting display system of claim 1, wherein the threshold distance is a maximum amount of distance between individual tiles of the plurality of tiles that is not resolvable by a viewer.

6. The light emitting display of claim 1, wherein the light emitting elements at the first edge have the average pitch with respect to adjacent light emitting elements at the second edge that is less than the average pitch between light emitting elements that are solely within the first tile.

7. A light emitting display, comprising:
a plurality of tiles mounted within a threshold distance with respect to each other, at least some tiles of the plurality of tiles being misaligned with respect to each other and comprising:
a density of light emitting elements positioned at an edge of a respective tile of the plurality of tiles that is greater than a density of light emitting elements in a center of the respective tile;
a first tile having a first edge; and
a second tile having a second edge positioned within the threshold distance with respect to the first edge such that light emitting elements at the first edge have an average pitch with respect to adjacent light emitting elements at the second edge that is different than an average pitch between light emitting elements that are solely within the first tile,
wherein the light emitting display is configured to display digital image data that has been modified using a calibration process, the calibration process comprising:
capturing positions of the plurality of tiles;
generating a tile pixel layout from the positions of the plurality of tiles;
calculating pixel positions and pixel densities of each tile of the plurality of tiles;
receiving an input digital image having equidistant pixel data;
resampling the input digital image using the pixel positions of each tile of the plurality of tiles to form a resampled digital image; and
scaling pixel values in the resampled digital image using the pixel densities of each tile of the plurality of tiles to form a modified digital image data to be displayed by the light emitting display.

8. The light emitting display of claim 7, wherein the calibration process further comprises performing a brightness calibration of light emitting elements of the light emitting display.

9. The light emitting display of claim 7, wherein the threshold distance is a maximum amount of distance between individual tiles of the plurality of tiles that is not resolvable by a viewer.

10. The light emitting display of claim 7, wherein each light emitting element on the first tile of the plurality of tiles that is at the first edge of the first tile is independently controllable, wherein at least some non-edge light emitting elements on the first tile are controllable as a group of light emitting elements.

11. The light emitting display of claim 7, wherein the threshold distance is based on a distance between the light emitting display and a closest row for patron seating to the light emitting display.

12. A display system comprising:
a first tile that includes:
a first edge at which a plurality of first edge light emitting elements are positioned; and
a plurality of light emitting elements including the plurality of first edge light emitting elements, the plurality of light emitting elements having a first average pitch between adjacent light emitting elements of the plurality of light emitting elements; and
a second tile mounted within a threshold distance with respect to the first edge of the first tile that includes:
a second edge at which a plurality of second edge light emitting elements are positioned, the second edge being positioned within the threshold distance with respect to the first edge and adjacent to the first edge such that the plurality of first edge light emitting elements have a second average pitch with respect to the adjacent plurality of second edge light emitting elements that is different than the first average pitch,
wherein the first tile and the second tile are configured to display digital image data that has been modified using a calibration process, the calibration process comprising:
capturing positions of the first tile and the second tile;

generating a tile pixel layout from the positions of the first tile and the second tile;

calculating pixel positions and pixel densities of the first tile and the second tile;

receiving an input digital image having equidistant pixel data;

resampling the input digital image using the pixel positions of the first tile and the second tile to form a resampled digital image; and scaling pixel values in the resampled digital image using the pixel densities of the first tile and the second tile to form a modified digital image data to be displayed by the first tile and the second tile.

13. The display system of claim 12, wherein the calibration process further comprises performing a brightness calibration of the plurality of light emitting elements and the plurality of second edge light emitting elements.

14. The display system of claim 12, wherein the threshold distance is a maximum amount of distance between the first tile and the second tile that is not resolvable by a viewer.

15. The display system of claim 12, wherein the plurality of first edge light emitting elements have the second average pitch with respect to the adjacent plurality of second edge light emitting elements that is less than the first average pitch.

16. A method for displaying content in a theatre comprising:

displaying image data by a plurality of tiles mounted within a threshold distance with respect to each other to form a light emitting display, the plurality of tiles including a first tile having a first edge and a second tile having a second edge positioned within the threshold distance with respect to the first edge such that light emitting elements at the first edge have an average pitch with respect to adjacent light emitting elements at the second edge that is different than an average pitch between light emitting elements that are solely within the first tile;

capturing, by an image acquisition device, positions of the plurality of tiles; and modifying, by a processor device, the image data based on position information of the plurality of tiles by:

generating a tile pixel layout from the positions of the plurality of tiles;

calculating pixel positions and pixel densities of each tile of the plurality of tiles;

receiving an input digital image having equidistant pixel data;

resampling the input digital image using the pixel positions of each tile of the plurality of tiles to form a resampled digital image; and scaling pixel values in the resampled digital image using the pixel densities of each tile of the plurality of tiles to form a modified digital image to be displayed by the light emitting display.

17. The method for displaying content of claim 16, further comprising:

independently controlling each light emitting element on a tile of the plurality of tiles that is at an edge of the tile; and controlling at least some non-edge light emitting elements on the tile as a group of light emitting elements.

18. The method for displaying content of claim 16, wherein the threshold distance is based on a distance between the light emitting display and a closest row for patron seating to the light emitting display.

19. The method for displaying content of claim 16, wherein the threshold distance is a maximum amount of distance between individual tiles of the plurality of tiles that is not resolvable by a viewer.

20. The method of claim 16, wherein the light emitting elements at the first edge have the average pitch with respect to adjacent light emitting elements at the second edge that is less than the average pitch between light emitting elements that are solely within the first tile.

21. A method comprising:

mounting a plurality of tiles in a light emitting display within a threshold distance with respect to each other, at least some tiles of the plurality of tiles being misaligned with respect to each other and comprising:

a density of light emitting elements positioned at an edge of a respective tile that is greater than a density of light emitting elements in a center of the respective tile;

a first tile having a first edge; and a second tile having a second edge positioned within the threshold distance with respect to the first edge such that light emitting elements at the first edge have an average pitch with respect to adjacent light emitting elements at the second edge that is different than an average pitch between light emitting elements that are solely within the first tile;

modifying digital image data for the light emitting display using a calibration process that involves capturing a position of tiles of the plurality of tiles, wherein the calibration process comprises:

capturing positions of the plurality of tiles;

generating a tile pixel layout from the positions of the plurality of tiles;

calculating pixel positions and pixel densities of each tile of the plurality of tiles;

receiving an input digital image having equidistant pixel data; resampling the input digital image using the pixel positions of each tile of the plurality of tiles to form a resampled digital image; and scaling pixel values in the resampled digital image using the pixel densities of each tile of the plurality of tiles to form a modified digital image data to be displayed by the light emitting display; and displaying, by the light emitting display, the modified digital image data.

22. The method of claim 21, wherein the calibration process further comprises performing a brightness calibration of light emitting elements of the light emitting display.

23. The method of claim 21, wherein the threshold distance is a maximum amount of distance between individual tiles of the plurality of tiles that is not resolvable by a viewer.

* * * * *